United States Patent
Kogure et al.

(10) Patent No.: US 9,860,729 B2
(45) Date of Patent: Jan. 2, 2018

(54) COMMUNICATION SYSTEM

(71) Applicant: NEC Corporation, Tokyo (JP)

(72) Inventors: Tomoya Kogure, Tokyo (JP); Yusuke Miyagawa, Tokyo (JP); Takayuki Kido, Tokyo (JP); Takuo Akimoto, Tokyo (JP); Yasuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/783,750

(22) PCT Filed: Feb. 27, 2014

(86) PCT No.: PCT/JP2014/054930
§ 371 (c)(1),
(2) Date: Oct. 9, 2015

(87) PCT Pub. No.: WO2014/171194
PCT Pub. Date: Oct. 23, 2014

(65) Prior Publication Data
US 2016/0073248 A1 Mar. 10, 2016

(30) Foreign Application Priority Data
Apr. 15, 2013 (JP) ................ 2013-084627

(51) Int. Cl.
*H04M 11/00* (2006.01)
*H04W 4/26* (2009.01)
(Continued)

(52) U.S. Cl.
CPC ........... *H04W 4/26* (2013.01); *H04L 12/1439* (2013.01); *H04L 12/1467* (2013.01);
(Continued)

(58) Field of Classification Search
None
See application file for complete search history.

(56) References Cited

U.S. PATENT DOCUMENTS 8,369,311 B1    2/2013  Kirchhoff et al.
8,620,265 B1 *  12/2013 Gailloux ............... H04M 15/28
                                                    379/114.01
(Continued)

FOREIGN PATENT DOCUMENTS

CN    101119411 A    2/2008
CN    102388637 A    3/2012
(Continued)

OTHER PUBLICATIONS

International Search Report corresponding to PCT/JP2014/054930 dated Apr. 22, 2014 (2 pages).
(Continued)

*Primary Examiner* — Erika Washington
(74) *Attorney, Agent, or Firm* — Wilmer Cutler Pickering Hale and Dorr LLP

(57) ABSTRACT

AS-B (810) measures a telephone call time from a time point when a telephone call, which is audio-originated by UE (100), starts. When a time obtained by subtracting the telephone call time from a time for which the UE (100) can telephone-call becomes a predetermined time, the AS-B (810) issues a multiplex instruction to FAP (200). When having received the multiplex instruction, the FAP (200) multiplexes a sound, which is based on a sound source file stored in advance, with audio data to be transmitted to the UE (100), and transmits the audio data, with which the sound has been multiplexed, to the UE (100).

5 Claims, 18 Drawing Sheets

(51) Int. Cl.
  *H04L 29/06*   (2006.01)
  *H04M 15/00*   (2006.01)
  *H04W 68/00*   (2009.01)
  *H04L 12/14*   (2006.01)
  *H04W 84/04*   (2009.01)

(52) U.S. Cl.
  CPC ...... *H04L 65/1016* (2013.01); *H04L 65/1089* (2013.01); *H04M 15/57* (2013.01); *H04M 15/63* (2013.01); *H04M 15/64* (2013.01); *H04W 68/005* (2013.01); *H04M 2215/208* (2013.01); *H04W 84/045* (2013.01)

(56) References Cited

U.S. PATENT DOCUMENTS

| | | | |
|---|---|---|---|
| 8,855,107 B1* | 10/2014 | Kirchhoff | H04M 1/2535 370/352 |
| 2002/0116546 A1 | 8/2002 | Takatama et al. | |
| 2010/0085978 A1* | 4/2010 | Ramankutty | H04L 12/14 370/401 |
| 2011/0173074 A1 | 7/2011 | Shinozaki | |
| 2011/0269427 A1 | 11/2011 | Kurokawa et al. | |

FOREIGN PATENT DOCUMENTS

| | | |
|---|---|---|
| CN | 102665178 A | 9/2012 |
| EP | 1235408 A2 | 8/2002 |
| EP | 2343682 A1 | 7/2011 |
| EP | 2418881 A1 | 2/2012 |
| JP | 2002-247617 A | 8/2002 |
| JP | 2004-289494 A | 10/2004 |
| JP | 2010-251861 A | 11/2010 |
| WO | WO-2010/049986 A1 | 5/2010 |
| WO | WO-2010/098355 A1 | 9/2010 |
| WO | WO-2012/103989 A1 | 8/2012 |

OTHER PUBLICATIONS

3GPP TS23.078 V11.3.0 (Jun. 2012) Technical Specification Group Core Network and Terminals; Customised Applications for Mobile Network Enhanced Logic (CAMEL) Phase 4; Stage 2 (Release 11) (pp. 1-749).

3GPP TS23.002 V12.1.0 (Dec. 2012) Technical Specification Group Services and Systems Aspects; Network Architecture (Release 12) (pp. 1-105).

Chinese First Office Action issued in corresponding Chinese Patent Application No. 201480021219.8, dated Dec. 30, 2016, 27 pages.

Extended European Search Report issued in corresponding European Patent Application No. 14785798.1, dated Nov. 8, 2016, 7 pages.

Pascal Kurtansky, et al. "State of the Art Prepaid Charging for IP Services", Jan. 1, 2006, Wired/Wireless Internet Communications, Lecture Notes in Computer Science; LNCS, Springer, Berlin, DE, pp. 143-154 (5 pages), XP019031626, ISBN:978-3-540-34023-2.

* cited by examiner

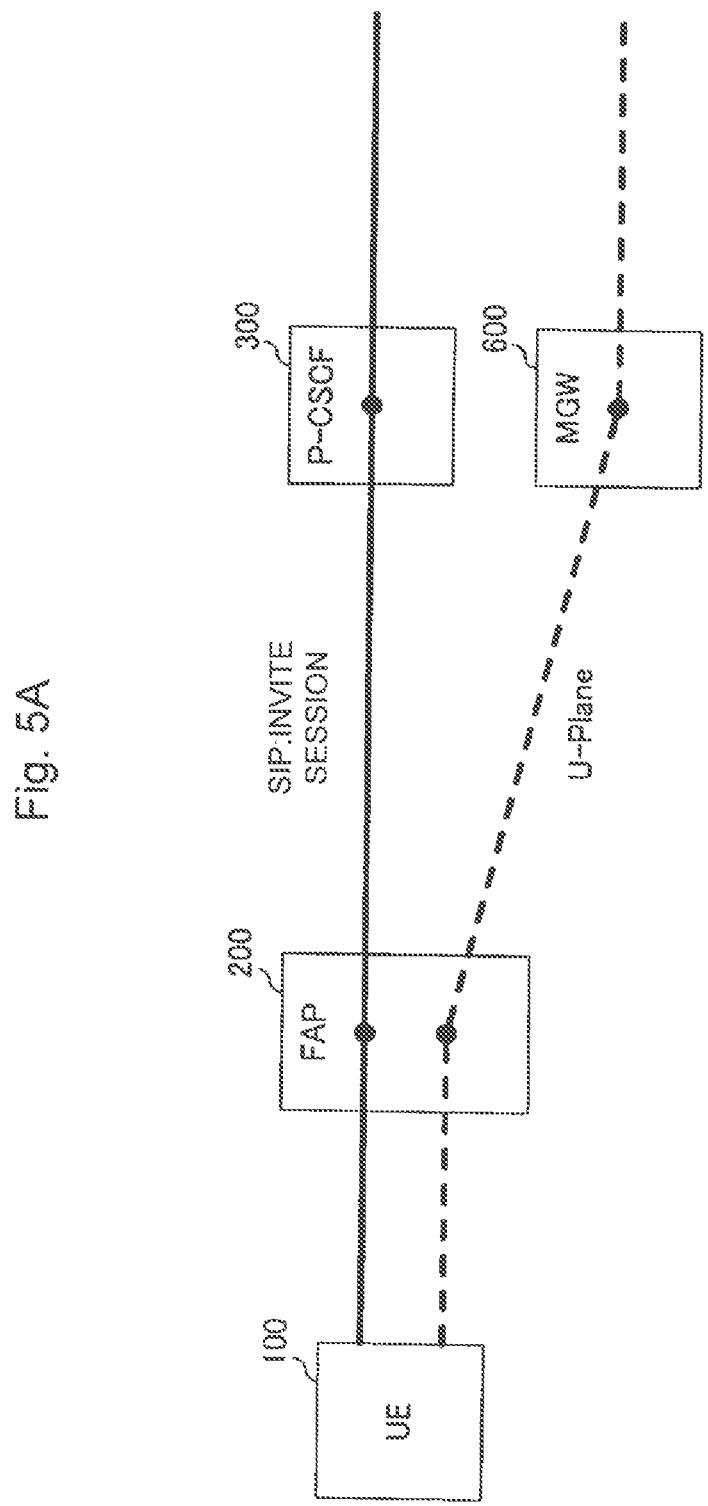

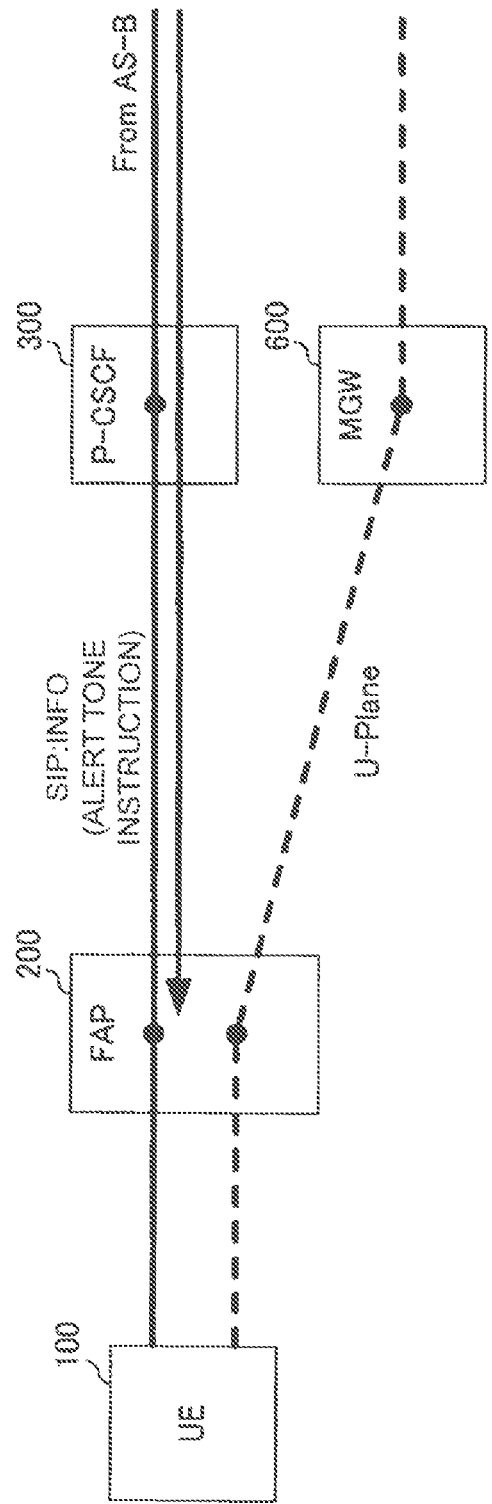

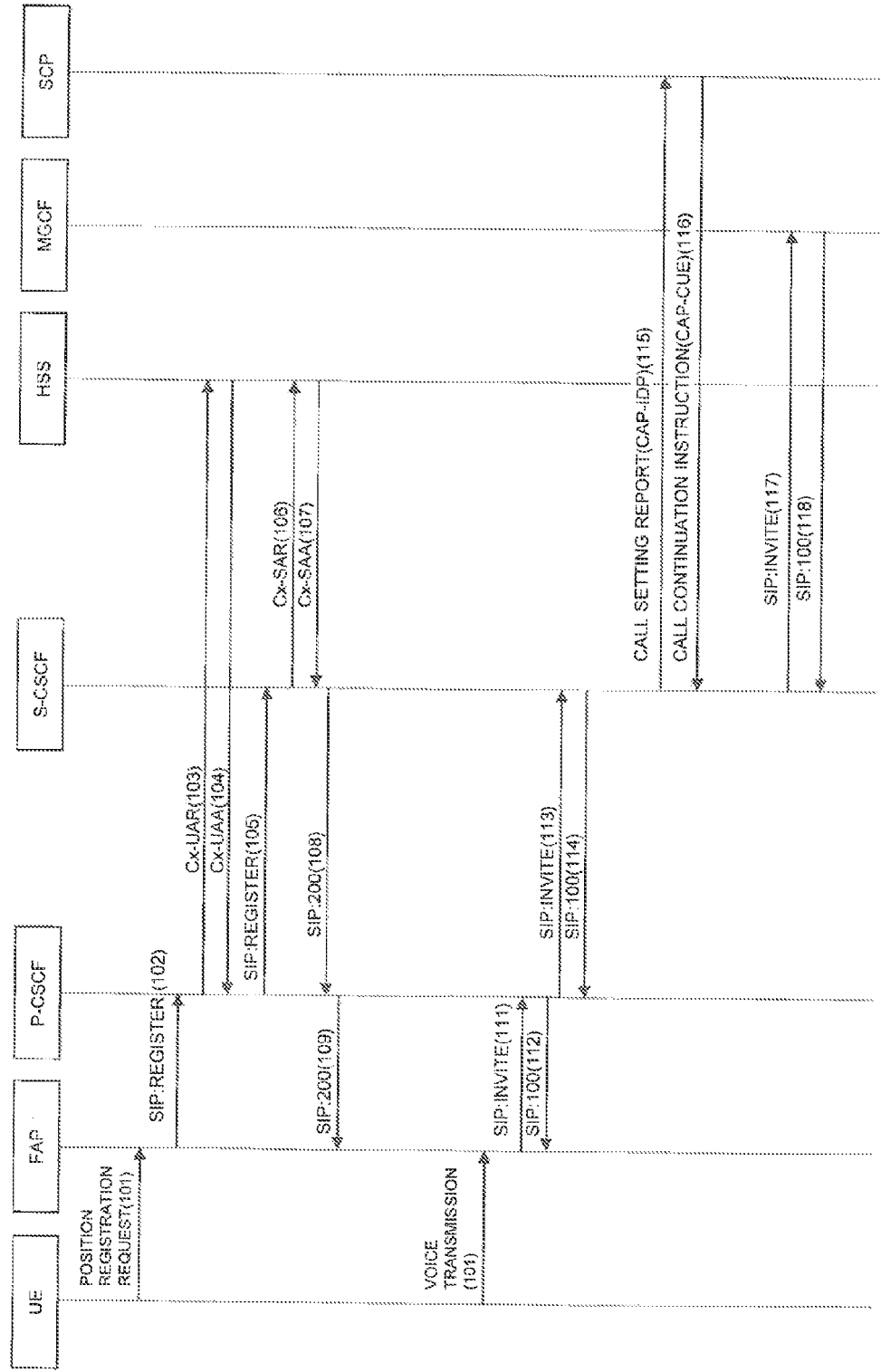

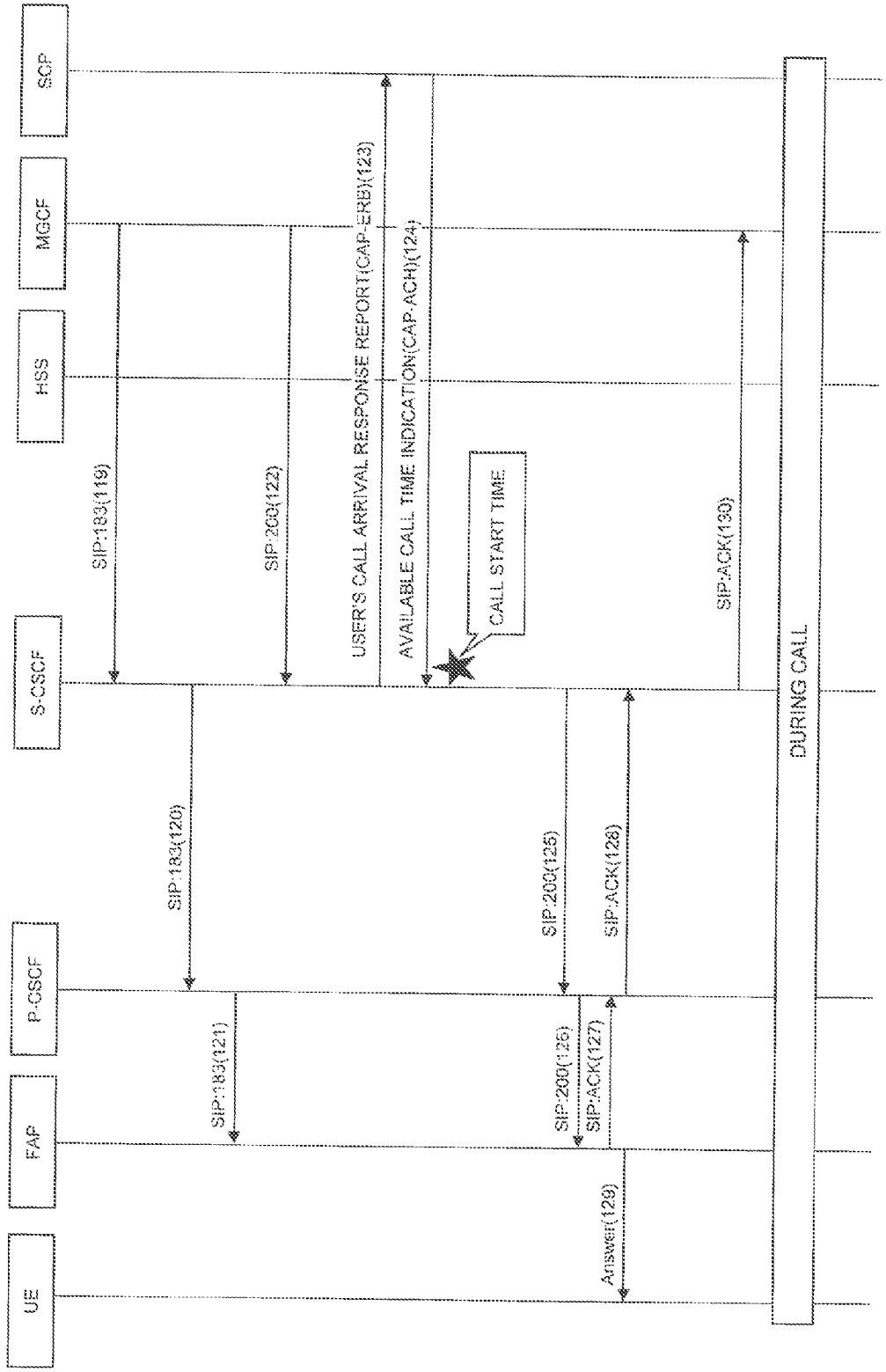

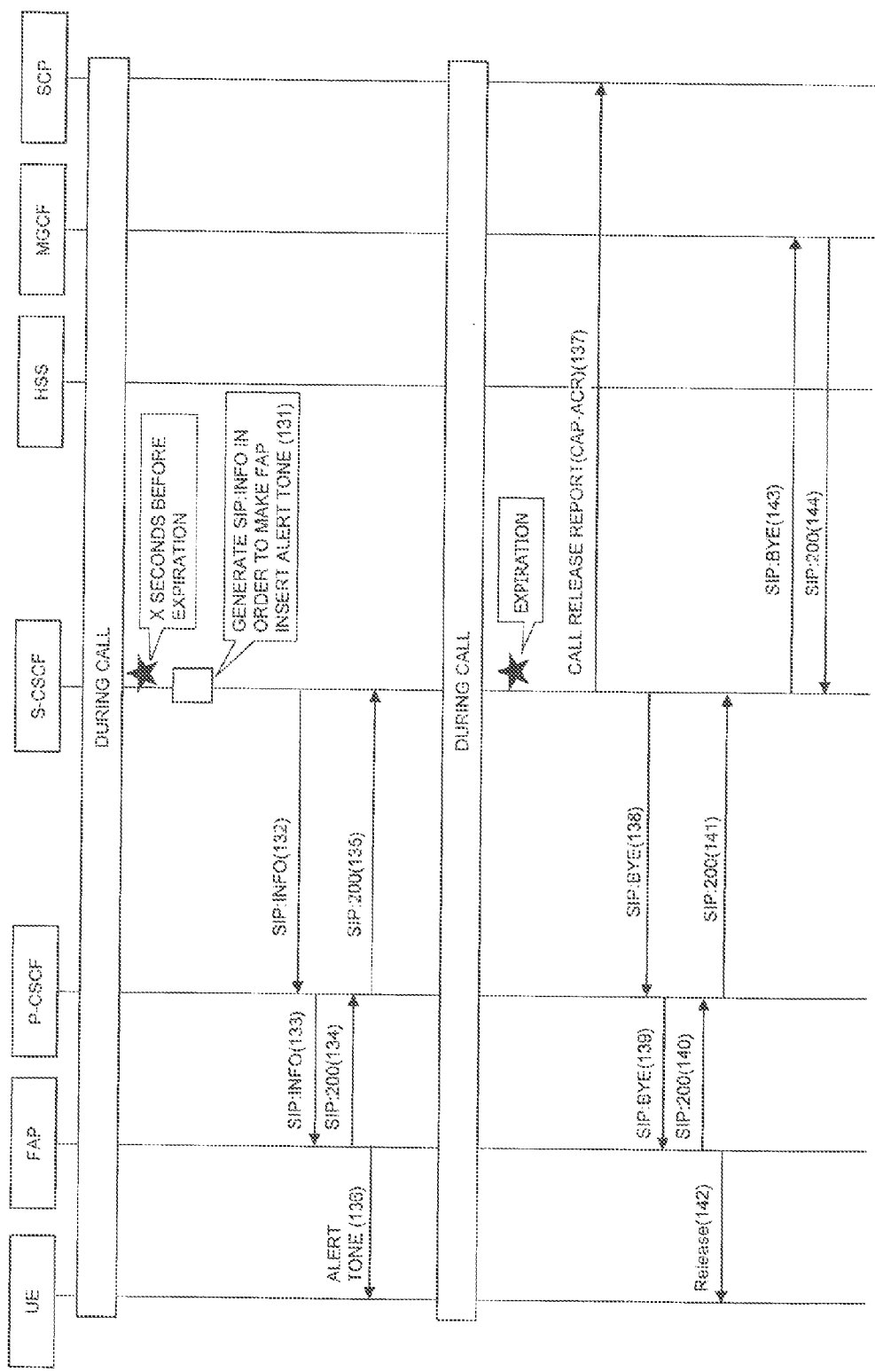

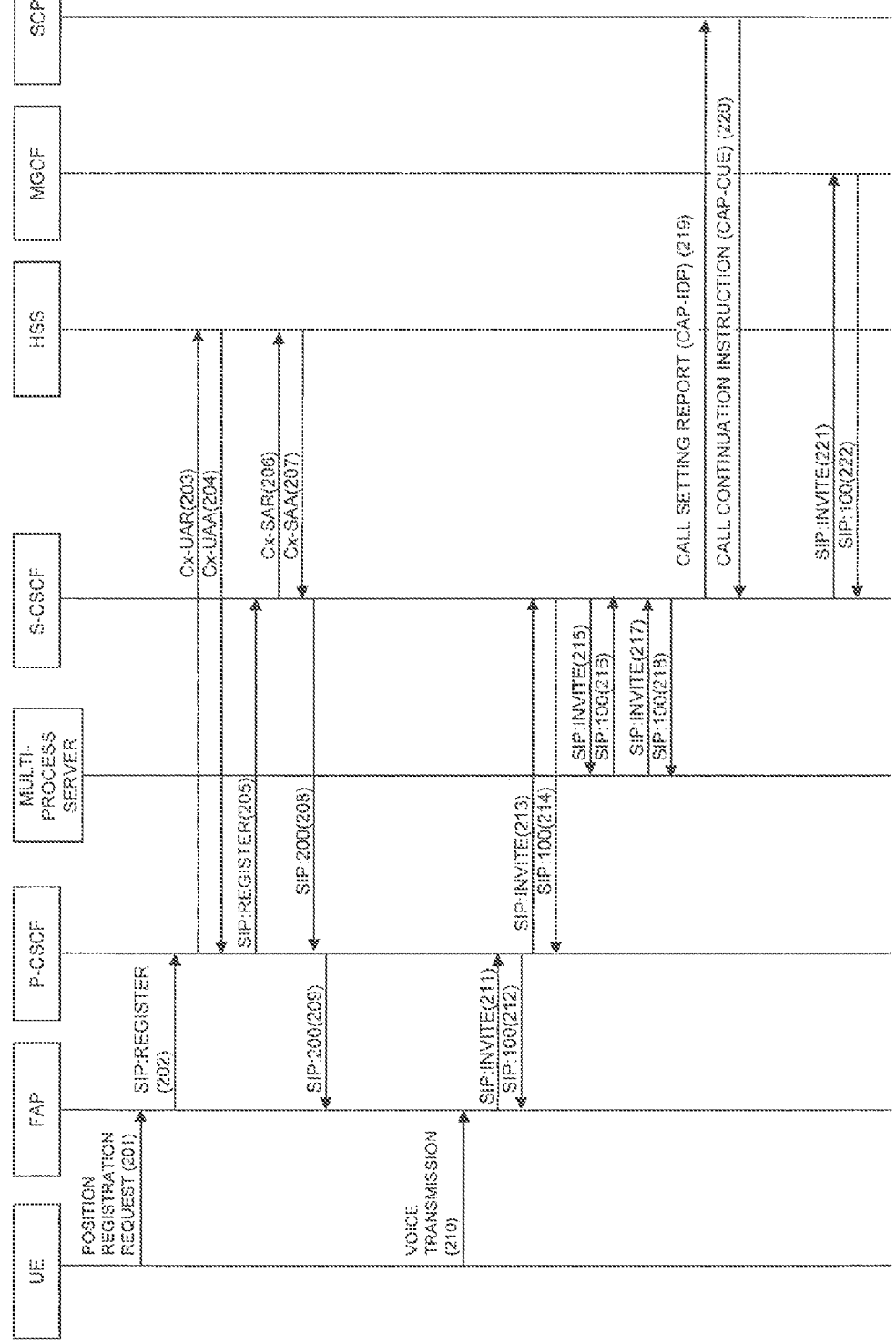

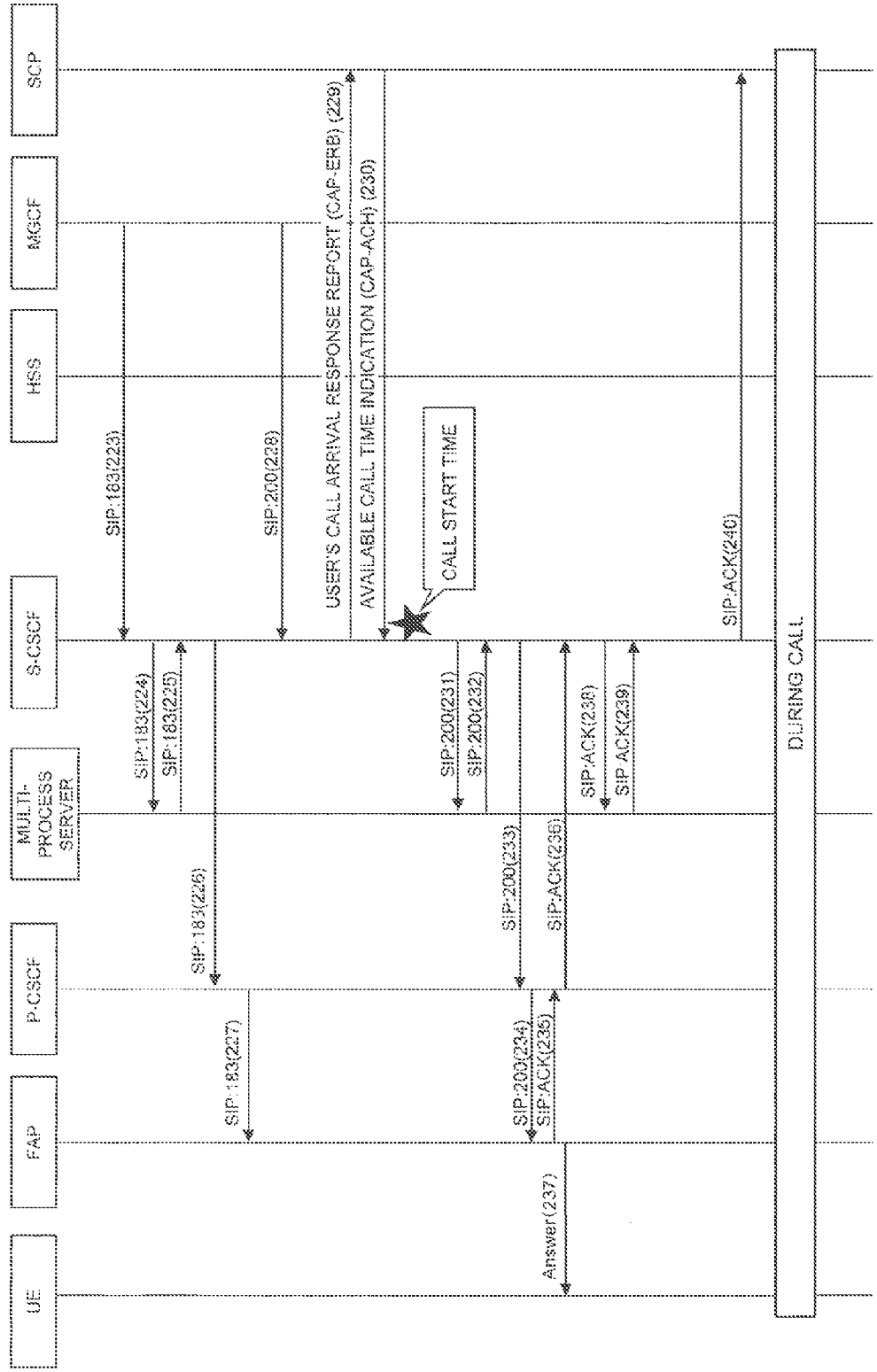

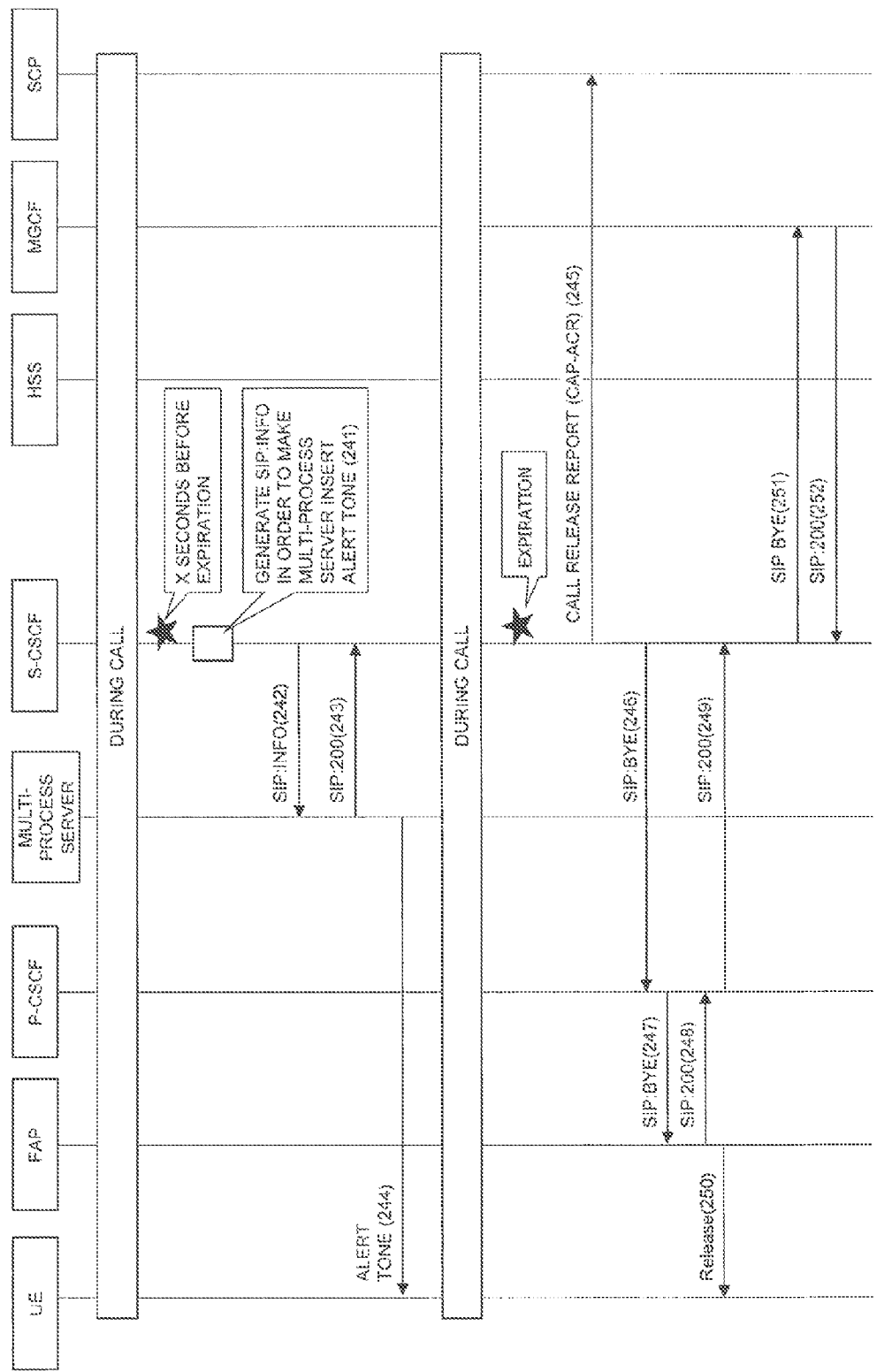

COMMUNICATION SYSTEM

CROSS-REFERENCE TO RELATED APPLICATIONS

This application is a national stage application of International Application No. PCT/JP2014/054930 entitled "Communication System" filed on Feb. 27, 2014, which claims priority to Japanese Application No. 2013-084627 filed on Apr. 15, 2013, the disclosures of which are hereby incorporated by reference in their entirety.

TECHNICAL FIELD

The present invention relates to a communication system, an application providing server, a SIP server, a femto-cell base station, a multi-process server, and a notification method which send a predetermined notification during a telephone call.

BACKGROUND ART

As a contract for using a communication terminal, there is a prepaid type contract which enables to use the communication terminal according to a predetermined charge which has been prepaid. In the case of the prepaid type contract, an available usage time of the communication terminal is limited. Then, in the case that an expiration time of the available usage time becomes close, a user can recognize that the expiration time of the available usage time becomes close if the user receives notification that the expiration time becomes close.

In the case of a 3G (3rd Generation) service, a mechanism that, just before an available usage time of a communication terminal which a prepaid user uses expires, a predetermined alert tone is sent to the communication terminal is standardized (refer to NPL 1).

On the other hand, architecture for realizing a CAMEL (Customized Applications for Mobile network Enhanced Logic) prepaid service in IMS (IP Multimedia Subsystem) is defined on the basis of the specification of 3 GPP (3rd Generation Partnership Project) (refer to NPL 2).

CITATION LIST

Non Patent Literature

NPL 1: 3GPP TS23.078 V11.3.0
NPL 2: 3GPP TS23.002 V12.1.0

Technical Problem

A prepaid service provided in IMS has no specification like the specification, which is described in NPL 1, in the 3G service. Therefore, the prepaid service provided in IMS has a problem that a user cannot recognize that the expiration time of the available usage time becomes close.

An object of the present invention is to provide a communication system, an application providing server, a SIP server, a femto-cell base station, a multi-process server, and a notification method which solve the above-mentioned problem.

Solution to Problem

A communication system of the present invention is a communication system which exists in an IMS (IP Multimedia Subsystem) network and which includes an application providing means, a SIP server, a femto-cell base station, and a communication terminal held by a prepaid user, wherein the application providing means starts measuring a calltime at a time when the communication terminal starts a voice transmitting call, and issues a multiplexing instruction to the femto-cell base station in the case that a time, which is acquired by subtracting the calltime from an available calltime of the communication terminal, reaches a predetermined time, and wherein when receiving the multiplexing instruction, the femto-cell base station sends a tone, which is based on a tone source file stored in advance, multiplexed with voice data which are sent to the communication terminal, to the communication terminal.

Moreover, a communication system of the present invention is a communication system which exists in an IMS network and which includes an application providing means, a femto-cell base station, and a communication terminal held by a prepaid user, wherein the communication system further includes a multi-process server arranged between a gateway which processes voice data of a voice transmitting call of the communication terminal, and the femto-cell base station, wherein the application providing means starts measuring a calltime at a time when the communication terminal starts the voice transmitting call, and issues a multiplexing instruction to the multi-process server in the case that a time, which is acquired by subtracting the calltime from an available calltime of the communication terminal, reaches a predetermined time, wherein when receiving the multiplexing instruction, the multi-process server sends a tone, which is based on a tone source file stored in advance, multiplexed with voice data which are sent to the communication terminal, to the femto-cell base station, and wherein the femto-cell base station sends the voice data, which are sent by the multi-process server and with which the tone is multiplexed, to the communication terminal.

Moreover, an application providing server of the present invention includes:

a time measuring unit which starts measuring a calltime at a time when a communication terminal, which is held by a prepaid user existing in an IMS network, starts a voice transmitting call; and an instruction unit which issues a multiplexing instruction to a femto-cell base station, which sends voice data to the communication terminal, in the case that a time, which is acquired by subtracting the calltime measured by the time measuring unit from an available calltime of the communication terminal, reaches a predetermined time.

Moreover, a SIP server of the present invention includes:

a time measuring unit which starts measuring a calltime at a time when a communication terminal, which is held by a prepaid user existing in an IMS network, starts a voice transmitting call; and an instruction unit which issues a multiplexing instruction to a femto-cell base station, which sends voice data to the communication terminal, in the case that a time, which is acquired by subtracting the calltime measured by the time measuring unit from an available calltime of the communication terminal, reaches a predetermined time.

Moreover, a femto-cell base station of the present invention includes:

a multiplexing unit which, when receiving a multiplexing instruction from an application providing unit which provides a service in an IMS network, multiplexes a tone, which is based on a tone source file stored in advance, with voice data which are sent to a communication terminal used by a prepaid user for voice transmission; and a sending unit which sends the voice data, with which the tone is multiplexed by the multiplexing unit, to the communication terminal.

Moreover, a multi-process server of the present invention includes:

a multiplexing unit which, when receiving a multiplexing instruction from an application providing unit which provides a service in an IMS network, multiplexes a tone, which is based on a tone source file stored in advance, with voice data which are sent to a communication terminal used by a prepaid user for voice transmission; and a sending unit to send the voice data, with which the tone is multiplexed by the multiplexing unit, to a femto-cell base station which sends voice data to the communication terminal.

A notification method of the present invention is a notification method in a communication system, which includes an application providing means, a femto-cell base station, and a communication terminal held by a prepaid user, in an IMS network comprising:

a process that the application providing means measures a calltime from a time when the communication terminal starts a voice transmitting call;

a process that the application providing means issues a multiplexing instruction to the femto-cell base station in the case that a time, which is acquired by subtracting the calltime from an available calltime of the communication terminal, reaches a predetermined time;

a process that, when receiving the multiplexing instruction, the femto-cell base station multiplexes a tone, which is based on a tone source file stored in advance, with voice data which are sent to the communication terminal; and a process that the femto-cell base station sends the voice data, with which the tone is multiplexed, to the communication terminal.

Advantageous Effects of Invention

As mentioned above, according to the present invention, in the prepaid service which is provided in IMS, a user can recognize that the expiration time of the available usage time becomes close.

BRIEF DESCRIPTION OF DRAWINGS

FIG. 5A is a diagram showing an example of flows of a SIP message and voice data which are generated during UE shown in FIG. 1 is talking.

FIG. 5B is a diagram showing an example of a flow of a message which is generated when an instruction to insert an alert tone is issued.

FIG. 8A is a sequence diagram for explaining a notification method in the communication system shown in FIG. 6.

FIG. 8B is a sequence diagram for explaining the notification method in the communication system shown in FIG. 6.

FIG. 8C is a sequence diagram for explaining the notification method in the communication system shown in FIG. 6.

FIG. 11A is a sequence diagram for explaining a notification method in the communication system shown in FIG. 9.

FIG. 11B is a sequence diagram for explaining the notification method in the communication system shown in FIG. 9.

FIG. 11C is a sequence diagram for explaining the notification method in the communication system shown in FIG. 9.

DESCRIPTION OF EMBODIMENTS

Hereinafter, an exemplary embodiment of the present invention will be explained with reference to drawings.

First Exemplary Embodiment

Figure 1:
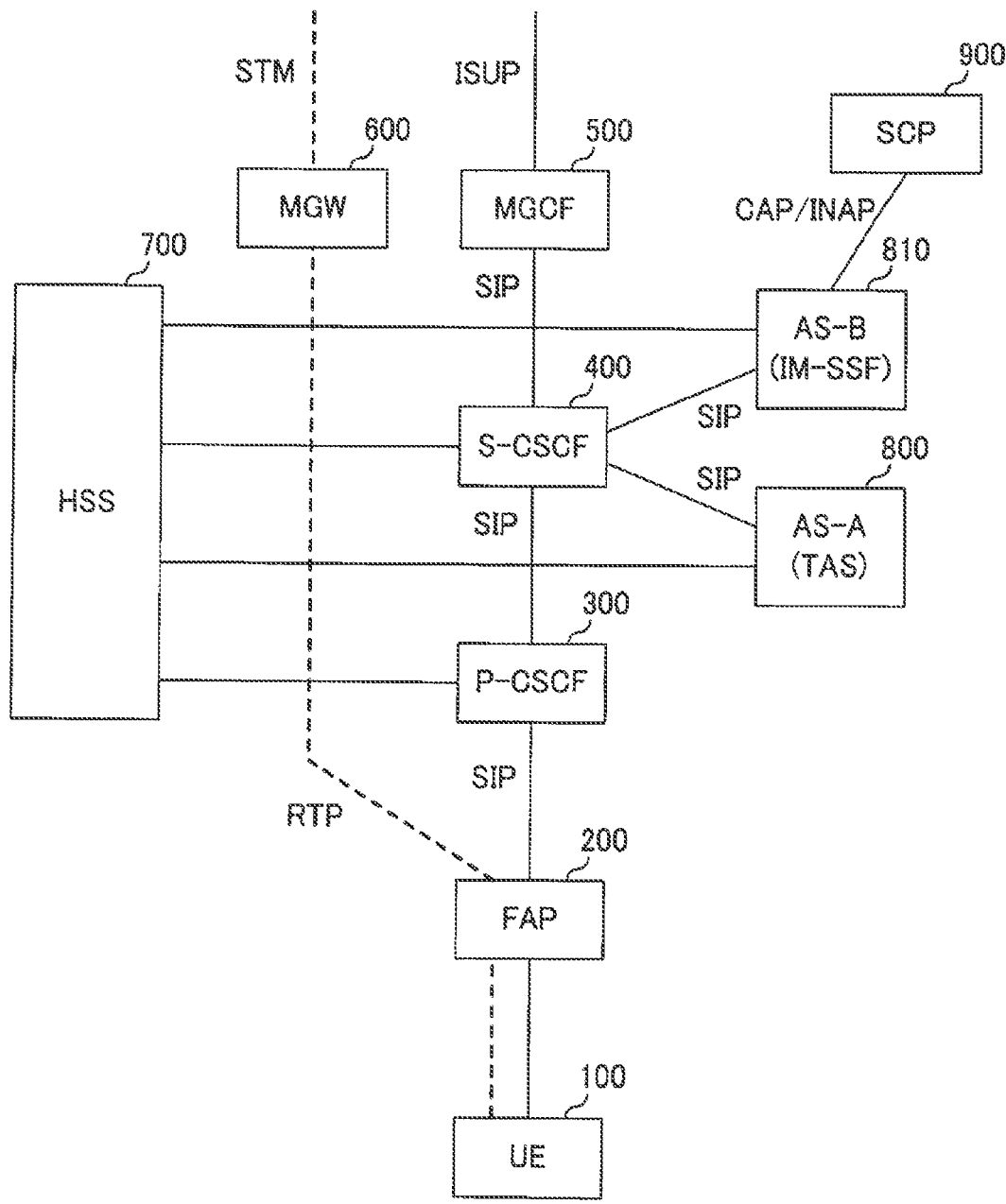
FIG. 1 is a diagram showing a first exemplary embodiment of a communication system of the present invention.

FIG. 1 is a diagram showing a first exemplary embodiment of a communication system of the present invention.

As shown in FIG. 1, the communication system of the present exemplary embodiment includes UE (User Equipment) 100, FAP (Femto Access Point) 200 which is a wireless base station and whose communication area is a 3G femto-area, P-CSCF (Proxy Call Session Control Function) 300, S-CSCF (Serving Call Session Control Function) 400, MGCF (Media Gateway Control Function) 500, MGW (Media Gateway) 600, HSS (Home Subscriber Server) 700, AS (Application Server)-A 800, AS-B 810 and SCP (Service Control Point) 900. Here, the communication system shown in FIG. 1 is included in an IMS network.

UE 100 is a communication terminal which has a 3G function. Moreover, UE 100 is a communication terminal which a prepaid user holds.

FAP 200 is a small-sized wireless base station (femto-cell base station) whose communication area is a 3G femto-area having a radius of several tens of meters. Moreover, FAP 200 stores a tone source file in advance. Moreover, when receiving a multiplexing instruction, FAP 200 multiplexes a tone, which is based on the stored tone source file, with voice data (U-Plane data) which are provided by MGW 600 and are sent to UE 100, and sends the voice data, with which an alert tone is multiplexed, to UE 100. Details of the multiplexing instruction will be mentioned later.

Each of P-CSCF 300 and S-CSCF 400 is a SIP (Session Initiation Protocol) server to hold subscriber information and user's current position information, which are downloaded from HSS 700, as a SIP registration server, and to control the SIP protocol.

MGCF 500 is a gateway apparatus carrying out mutual conversion between a SIP message which is communication protocol defined between MGCF 500 and S-CSCF 400, and an ISUP (Integrated Services Digital Network User Part) message.

MGW 600 is a gateway which processes voice data, that is, user data, of a call corresponding to U-plane data of a circuit switching network. Moreover, MGW 600 carries out mutual conversion between RTP (Real-time Transport Protocol) and STM (Synchronous Transfer Mode).

HSS 700 is an apparatus which stores and manages subscriber information of UE 100.

AS-A 800 is a server which realizes a TAS (Telephony AS) function.

AS-B 810 is an application providing server (application providing means) which realizes IM-SSF (IP-Multimedia Service Switching Function). Moreover, AS-B 810 starts measuring a calltime at a time when UE 100 starts a voice transmitting call. Moreover, in the case that UE 100 starts the call, AS-B 810 acquires an available calltime of UE 100 from SCP 900. Moreover, AS-B 810 issues a multiplexing instruction to FAP 200 through S-CSCF 400 and P-CSCF 300 in the case that a time, which is acquired by subtracting the measured calltime from the available call time of UE 100 acquired from SCP 900, reaches a predetermined time.

SCP 900 is a physical entity generated by modeling a node or an apparatus which realizes a service control function (control provision of service) in an intelligent network conceptual model. Moreover, SCP 900 holds information indicating the available calltime (remainder) of the prepaid user (UE 100). Moreover, when a user's call arrival response report is outputted, SCP 900 indicates the available calltime of UE100 to a base station which responds.

Figure 2:
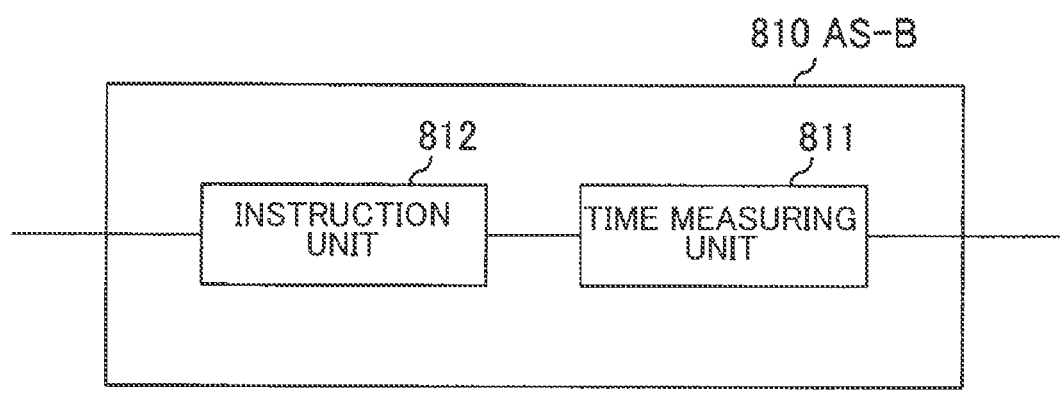
FIG. 2 is a diagram showing an example of an internal configuration of AS-B shown in FIG. 1.

FIG. 2 is a diagram showing an example of an internal configuration of AS-B 810 shown in FIG. 1.

AS-B 810 shown in FIG. 1 includes a time measuring unit 811 and an instruction unit 812 as shown in FIG. 2. Here, FIG. 2 shows an example of main components, which relate to the present exemplary embodiment, out of the components of AS-B 810 shown in FIG. 1.

The time measuring unit 811 starts measuring the calltime at the time when UE 100 starts the voice transmitting call. Moreover, in the case that UE 100 starts the call, the time measuring unit 811 acquires the available calltime of UE 100 from SCP 900.

The instruction unit 812 issues the multiplexing instruction to FAP 200 through S-CSCF 400 and P-CSCF 300 in the case that the time, which is acquired by subtracting the calltime measured by the time measuring unit 811 from the UE 100's available calltime which the time measuring unit 811 acquires from SCP 900, reaches a predetermined time. That is, the instruction unit 812 issues the multiplexing instruction at a point of time which is earlier than an expiration time of the available calltime of UE 100 by a predetermined time. The predetermined time can be set externally and is set in order to notify that the available calltime (remainder) expires soon.

Figure 3:
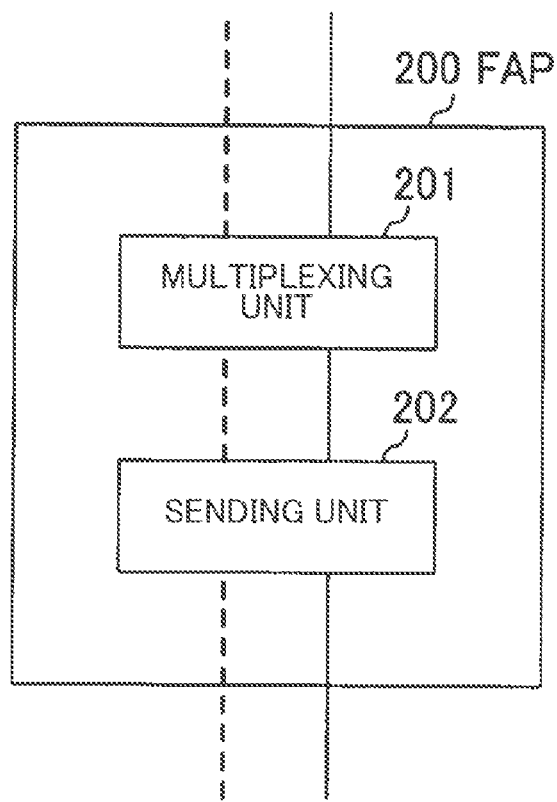
FIG. 3 is a diagram showing an example of an internal configuration of FAP shown in FIG. 1.

FIG. 3 is a diagram showing an example of an internal configuration of FAP 200 shown in FIG. 1.

FAP 200 shown in FIG. 1 includes a multiplexing unit 201 and a sending unit 202 as shown in FIG. 3. Here, FIG. 3 shows an example of main components, which are related to the present exemplary embodiment, out of the components of FAP 200 shown in FIG. 1.

When receiving the multiplexing instruction from AS-B 801 through S-CSCF 400 and P-CSCF 300, the multiplexing unit 201 multiplexes the tone, which is based on the tone source file stored in advance, with the voice data which are provided by MGW 600 and are sent to UE 100.

The sending unit 202 sends the voice data, with which the tone is multiplexed by the multiplexing unit 201, to UE 100.

Hereinafter, a notification method in the communication system shown in FIG. 1 will be explained. Here, each signal, which is used for sending and receiving information, is based on corresponding protocol.

Figure 4A:
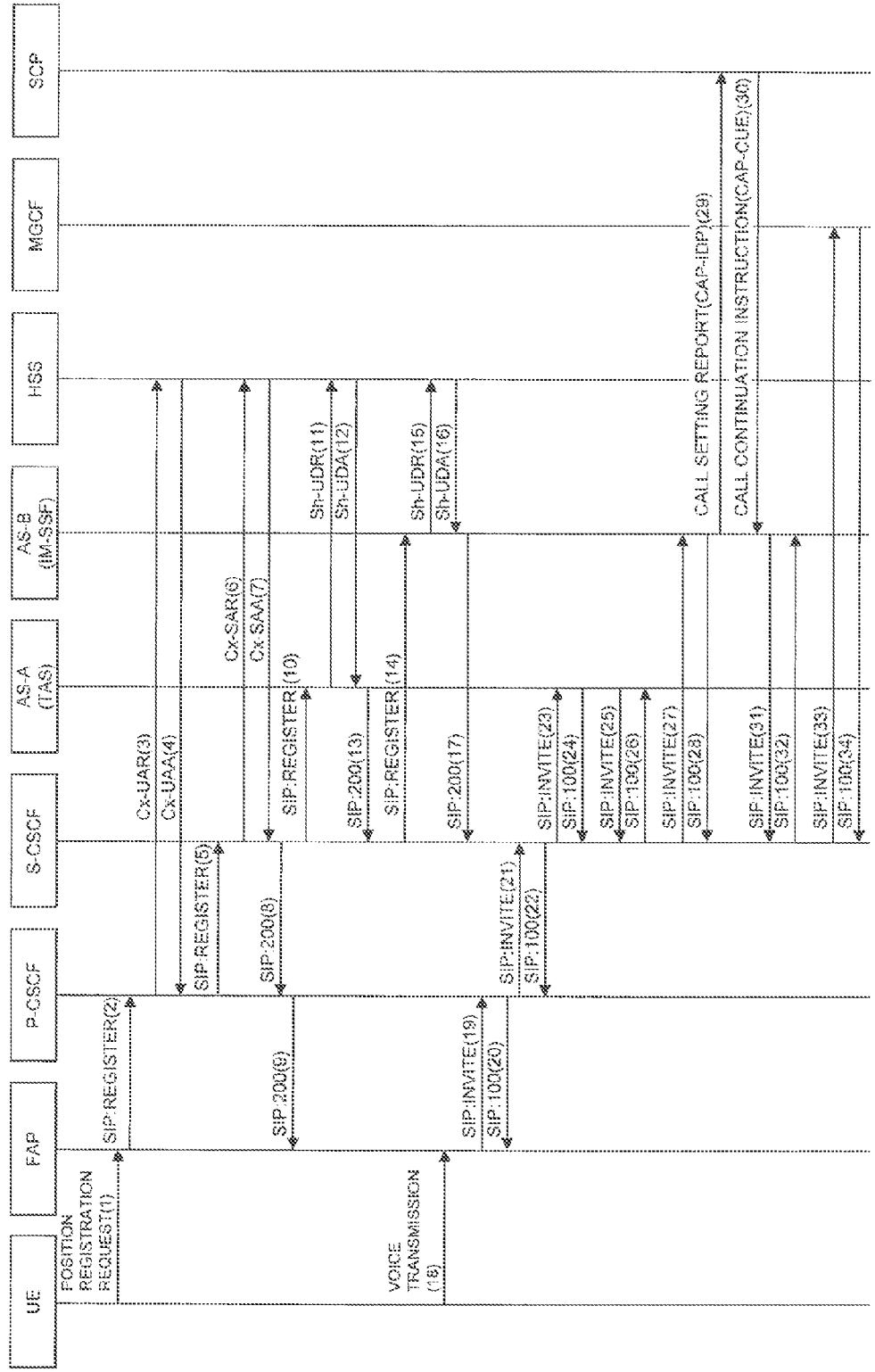
FIG. 4A is a sequence diagram for explaining a notification method in the communication system shown in FIG. 1.
Figure 4B:
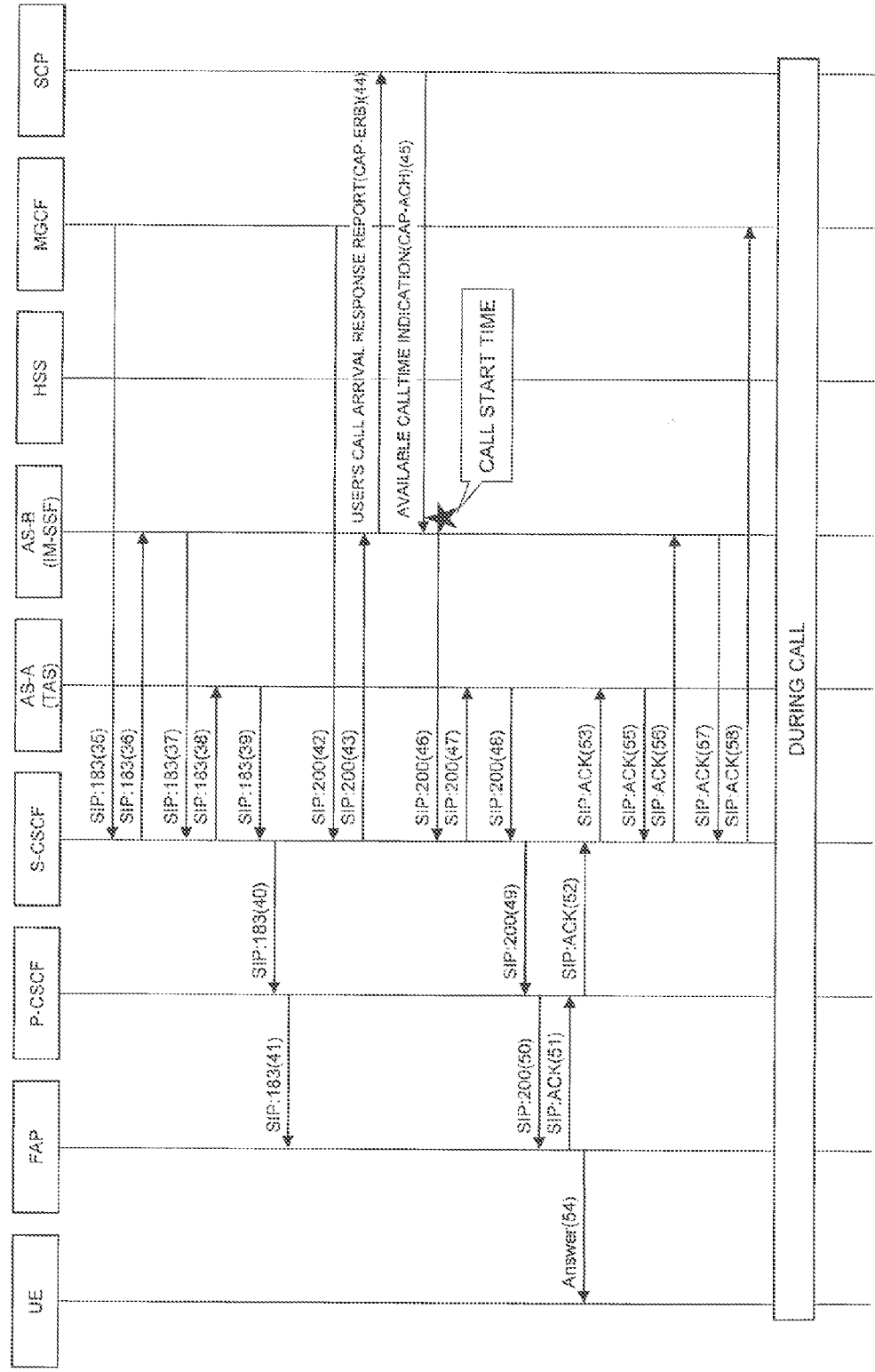
FIG. 4B is a sequence diagram for explaining the notification method in the communication system shown in FIG. 1.
Figure 4C:
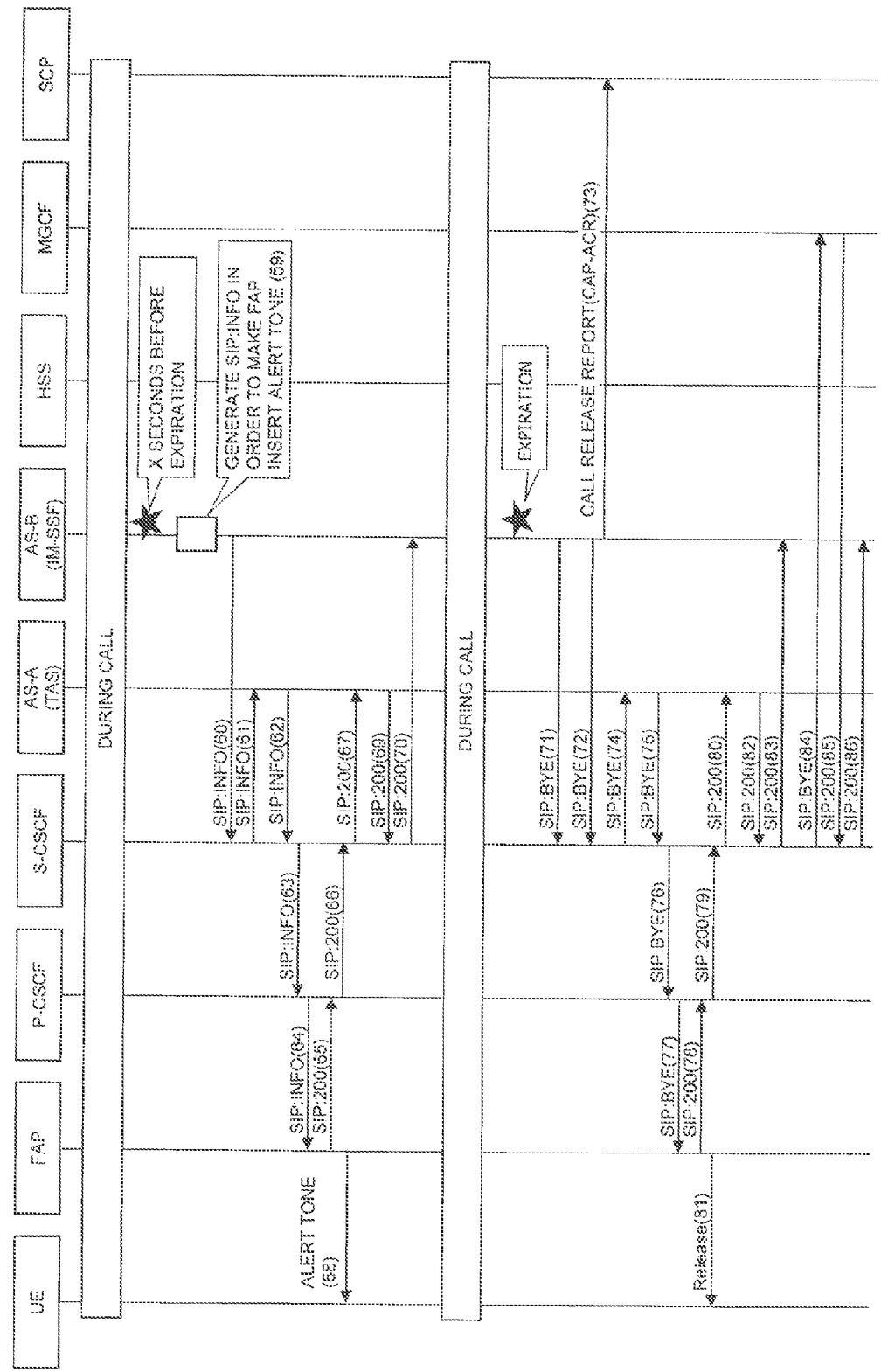
FIG. 4C is a sequence diagram for explaining the notification method in the communication system shown in FIG. 1.

Each of FIGS. 4A to 4C is a sequence diagram showing the notification method in the communication system shown in FIG. 1.

Firstly, when UE 100 issues a position registration request to FAP 200 (Step 1), FAP 200 issues a UE 100's position registration request by sending SIP-REGISTER to P-CSCF 300 (Step 2). Then, P-CSCF 300 issues a UE 100's position registration request by sending Dia-Cx-UAR to HSS 700 (Step 3). HSS 700, which receives Dia-Cx-UAR, issues a position registration response by sending Dia-Cx-UAA to P-CSCF 300 as a response to Dia-Cx-UAR (Step 4)

Then, P-CSCF 300 issues a UE 100's position registration request by sending SIP-REGISTER to S-CSCF 400 (Step 5). S-CSCF 400, which receives SIP-REGISTER, issues a UE 100's position registration request by sending Dia-Cx-SAR to HSS 700 (Step 6). HSS 700, which receives Dia-Cx-SAR, issues a position registration response by sending Dia-Cx-SAA to S-CSCF 400 (Step 7).

Then, S-CSCF 400, which receives Dia-Cx-SAA, issues a position registration response by sending SIP-200 OK to P-CSCF 300 as a response to Step 5 (Step 8). P-CSCF 300, which receives SIP-200 OK, issues a position registration response by sending SIP-200 OK to FAP 200 as a response to Step 2 (Step 9).

Besides, S-CSCF 400 sends SIP-REGISTER to AS-A 800 (Step 10). AS-800, which receives SIP-REGISTER, requests acquisition of subscriber data on UE 100 by sending Sh-UDR, which is specified by the Diameter protocol, to HSS 700 (Step 11). HSS 700, which receives Sh-UDR, sends the subscriber data on UE 100 to AS-A 800 by use of Sh-UDA which is a response to Sh-UDR (Step 12). AS-A 800, which receives Sh-UDA, responds to Step 10 by sending SIP-200 OK to S-CSCF 400 (Step 13).

Moreover, S-CSCF 400 sends SIP-REGISTER to AS-B 810 (Step 14). AS-B 810, which receives SIP-REGISTER, requests acquisition of the subscriber data on UE 100 by sending Sh-UDR to HSS 700 (Step 15). HSS 700, which receives Sh-UDR, sends the subscriber data on UE 100 to AS-B 810 by use of Sh-UDA which is a response to Sh-UDR (Step 16). AS-B 810, which receives Sh-UDA, responds to Step 14 by sending SIP-OK 200 to S-CSCF 400 (Step 17).

Afterward, UE 100 requests voice transmission to FAP 200 (Step 18), and then FAP 200 issues a voice transmission request to P-CSCF 300 by sending SIP-INVITE (Step 19). Then, by sending SIP-100 to FAP 200, P-CSCF 300 notifies that INVITE is being executed (Step 20). Moreover, P-CSCF 300 sends SIP-INVITE to S-CSCF 400 for establishing a session (Step 21). Then, by sending SIP-100 to P-CSCF 300, S-CSCF 400 notifies that INVITE is being executed (Step 22). Moreover, S-CSCF 400 sends SIP-INVITE to AS-A 800 (Step 23). Then, by sending SIP-100 to S-CSCF 400, AS-A 800 notifies that INVITE is being executed (Step 24). Moreover, AS-A800 sends SIP-INVITE to S-CSCF 400 (Step 25). Then, by sending SIP-100 to AS-A 800, S-CSCF 400 notifies that INVITE is being executed (Step 26).

Moreover, S-CSCF 400 sends SIP-INVITE to AS-B 810 (Step 27). Then, by sending SIP-100 to S-CSCF 400, AS-B 810 notifies that INVITE is being executed (Step 28).

Next, AS-B 810 outputs a call setting report by sending CAP (CAMEL Application Part)-IDP (Initial DP) to SCP 900 (Step 29). SCP 900, which receives CAP-IDP, issues a call continuation instruction by sending CAP-CUE (Continue) to AS-B 810 (Step 30).

Moreover, AS-B 810 sends SIP-INVITE to S-CSCF 400 (Step 31). Then, by sending SIP-100 to AS-B 810, S-CSCF 400 notifies that INVITE is being executed (Step 32).

Moreover, S-CSCF 400 sends SIP-INVITE to MGCF 500 (Step 33). Then, by sending SIP-100 to S-CSCF 400, MGCF 500 notifies that INVITE is being executed (Step 34).

Moreover, by sending SIP-183 to S-CSCF 400, MGCF 500 notifies that a session is being progressed (Step 35). Then, by sending SIP-183 to AS-B 810, S-CSCF 400 notifies that a session is being progressed (Step 36).

Next, by sending SIP-183 to S-CSCF 400, AS-B 810 notifies that a session is being progressed (Step 37). Then, by sending SIP-183 to AS-B 800, S-CSCF 400 notifies that a session is being progressed (Step 38).

Then, AS-A 800 sends SIP-183 to S-CSCF 400 (Step 39). S-CSCF 400, which receives SIP-183, sends SIP-183 to P-CSCF 300 (Step 40). P-CSCF 300, which receives SIP-183, sends SIP-183 to FAP 200 (Step 41).

Afterward, MGCF 500 responds to the transmission request by sending SIP-200 OK to S-CSCF 400 (Step 42). S-CSCF 400, which receives SIP-200 OK, sends SIP-200 OK to AS-B 810 (Step 43).

Then, AS-B 810 outputs a user's call arrival response report by sending CAP-ERB (Event Report BSCM) to SCP 900 (Step 44). SCP 900, which receives CAP-ERB, indicates the available calltime of UE 100 by sending CAP-ACH (Apply Charging) to AS-B 810 (Step 45). This point of time is a call start time, and the time measuring unit 811 starts measuring the calltime. Moreover, AS-B 810 acquires the available calltime of UE 100 by receiving this CAP-ACH.

Moreover, AS-B 810 sends SIP-200 OK to S-CSCF 400 (Step 46). S-CSCF 400, which receives SIP-200 OK, sends SIP-200 OK to AS-A 800 (Step 47). AS-A 800, which receives SIP-200 OK, sends SIP-200 OK to S-CSCF 400 (Step 48). S-CSCF 400 sends SIP-200 OK to P-CSCF 300 (Step 49). P-CSCF 300 sends SIP-200 OK to FAP 200 (Step 50).

Then, FAP 200 sends SIP-ACK to P-CSCF 300 (Step 51). P-CSCF 300 sends SIP-ACK to S-CSCF 400 (Step 52). S-CSCF 400 sends SIP-ACK to AS-A 800 (Step 53). By carrying out the above, FAP 200 sends a notification, which indicates that FAP 200 acknowledges establishment of the session, to AS-A 800.

Moreover, FAP 200 responds (Answer) to the transmission request of UE 100 (Step 54).

Moreover, AS-A 800, which receives SIP-ACK, sends SIP-ACK to S-CSCF 400 (Step 55). Then, S-CSCF 400 sends SIP-ACK to AS-B 810 (STEP 56). AS-B 810, which receives SIP-ACK, sends SIP-ACK to S-CSCF 400 (Step 57). Then, S-CSCF 400 sends SIP-ACK to MGCF 500 (Step 58).

In the case that, as a result of starting the call, the time, which is acquired by subtracting the time measured by the time measuring unit 811 from the available calltime of UE 100 acquired by AS-B 810 in Step 45, reaches the predetermined time (for example, X seconds), that is, in the case that, as a result of the time measurement by the time measuring unit 811, the left time of the available call time of UE 100 reaches X seconds before expiration of the available calltime of UE 100, the instruction unit 812 generates a message (SIP-INFO) in order to make FAP 200 insert (multiplex) the alert tone in the voice data (Step 59). Then, the instruction unit 812 sends the generated SIP-INFO to S-CSCF 400 (Step 60). S-CSCF 400, which receives SIP-INFO, sends SIP-INFO to AS-A 800 (Step 61). Then, AS-A 800 sends SIP-INFO to S-CSCF 400 (Step 62). S-CSCF 400 sends SIP-INFO to P-CSCF 300 (Step 63). P-CSCF 300 sends SIP-INFO to FAP 200 (Step 64).

FAP 200, which receives SIP-INFO, sends SIP-200 OK to P-CSCF 300 as a response to SIP-INFO (Step 65). P-CSCF 300 sends SIP-200 OK to S-CSCF 400 (Step 66). S-CSCF 400 sends SIP-200 OK to AS-A 800 (Step 67).

Moreover, the multiplexing unit 201 of FAP 200, which receives SIP-INFO sent by P-CSCF 300 in Step 64, multiplexes (insert) the alert tone, which is based on the stored tone source file, with the voice data sent to UE 100. Then, the sending unit 202 sends the voice data, with which the alert tone is multiplexed, to UE 100 (Step 68).

Moreover, AS-A 800, which receives SIP-200 OK sent by S-CSCF 400, sends SIP-200 OK to S-CSCF 400 (Step 69). Then, S-CSCF 400, which receives SIP-200 OK, sends SIP-200 OK to AS-B 810 (Step 70).

In the case that, as a result of continuation of the call, the available call time of UE 100, which AS-B 810 acquires in Step 45, becomes equal to the time which is measured by the time measuring unit 811, that is, in the case that the available call time of UE 100 expires, AS-B 810 issues a session disconnection request by sending SIP-BYE to S-CSCF 400 (Steps 71 and 72). Moreover, AS-B 810 outputs a call release report by sending CAP-ACR (Apply Charging Report) to SCP 900 (Step 73).

S-CSCF 400, which receives SIP-BYE sent by AS-B 810, issues a session disconnection request by sending SIP-BYE to AS-A 800 (Step 74). Then, AS-A 800 sends SIP-BYE to S-CSCF 400 (Step 75). S-CSCF 400 sends SIP-BYE to P-CSCF 300 (Step 76). P-CSCF 300 sends SIP-BYE to FAP 200 (Step 77).

FAP 200, which receives SIP-BYE sent by P-CSCF 300, sends SIP-200 OK to P-CSCF 300 as a response to SIP-BYE (Step 78). P-CSCF 300 sends SIP-200 OK to S-CSCF 400 (Step 79). S-CSCF 400 sends SIP-200 OK to AS-A 800 (Step 80).

Moreover, FAP 200, which receives SIP-BYE sent by P-CSCF 300 in Step 77, releases the call of UE 100 and carries out disconnection (Step 81).

Moreover, AS-A 800, which receives SIP-200 OK sent by S-CSCF 400 in Step 80, sends SIP-200 OK to S-CSCF 400 (Step 82). Then, S-CSCF 400 sends SIP-200 OK to AS-B 810 (Step 83).

Moreover, S-CSCF 400 sends SIP-BYE to MGCF 500 (Step 84). Then, MGCF 500 sends SIP-200 OK to S-CSCF 400 as a response to SIP-BYE (Step 85). Then, S-CSCF 400, which receives SIP-200 OK, sends SIP-200 OK to AS-B 810 (Step 86).

Here, each of CAP-IDP, CAP-CUE, CAP-ERB, CAP-ACH and CAP-ACR is a signal of CAP which is an interface between the CAMEL server and IM-SSF. The above mention is similarly applied to the following exemplary embodiment.

FIG. 5A is a diagram showing an example of flows of the SIP message and the voice data which are generated during UE 100 shown in FIG. 1 is talking.

As shown in FIG. 5A, SIP-INVITE, which is the SIP message, is sent by P-CSCF 300 to FAP 200 before SIP- INFO which is the instruction to insert the alert tone is received. Meanwhile, the voice data of U-Plane is sent to FAP 200 through MGW 600.

FIG. 5B is a diagram showing an example of a flow of a message which is generated at a time when the instruction to insert the alert tone is issued.

As shown in FIG. 5B, when the instruction to insert the alert tone is issued, AS-B 810 which is IM-SSF issues the instruction to insert the alert tone by use of SIP-INFO through P-CSCF 300.

Figure 5C:
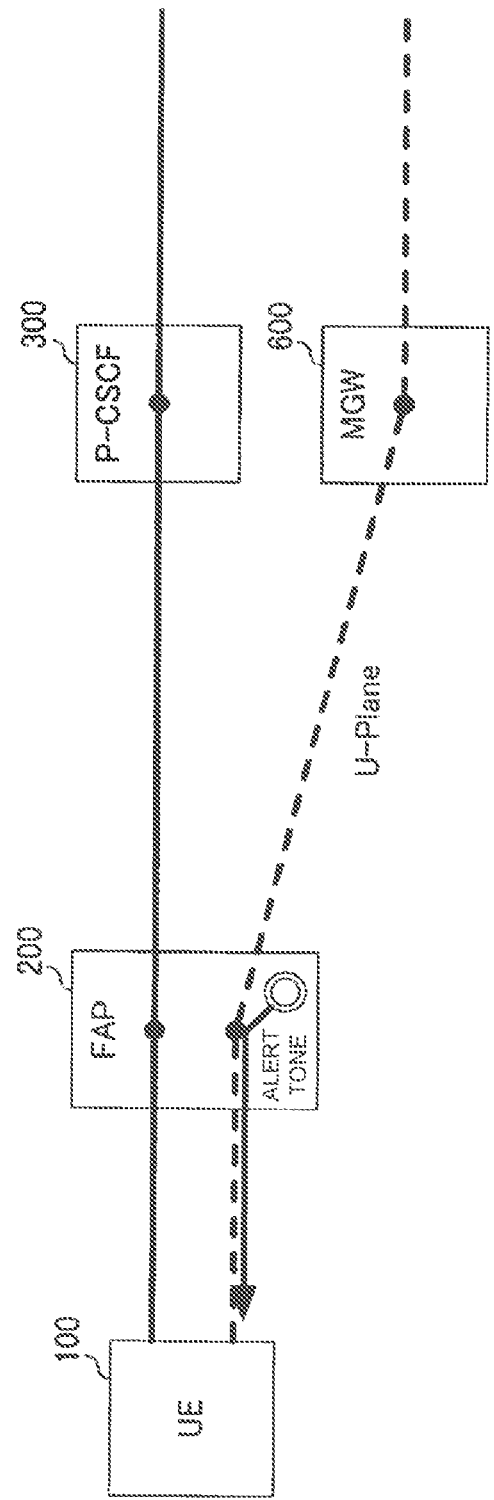
FIG. 5C is a diagram showing an example of a situation that, after the instruction to insert the alert tone is issued, the alert tone is inserted (multiplexed) in the voice data.

FIG. 5C is a diagram showing an example of an operation that, after the instruction to insert the alert tone is issued, the alert tone is inserted (multiplexed) in the voice data.

As shown in FIG. 5C, FAP 200 inserts (multiplex) the alert tone in the voice data which are sent to UE 100. Specifically, the alert tone which FAP 200 stores, and the call voice which is addressed to UE 100 held by the prepaid user are multiplexed together, and the call voice with which the alert tone is multiplexed is sent to UE 100. Here, since FAP 200 knows a telephone number of the prepaid user, FAP 200 can recognize the call voice which is addressed to UE 100.

Second Exemplary Embodiment

S-CSCF, which is the SIP server, may include the AS function (application providing means) which is used in the first exemplary embodiment.

Figure 6:
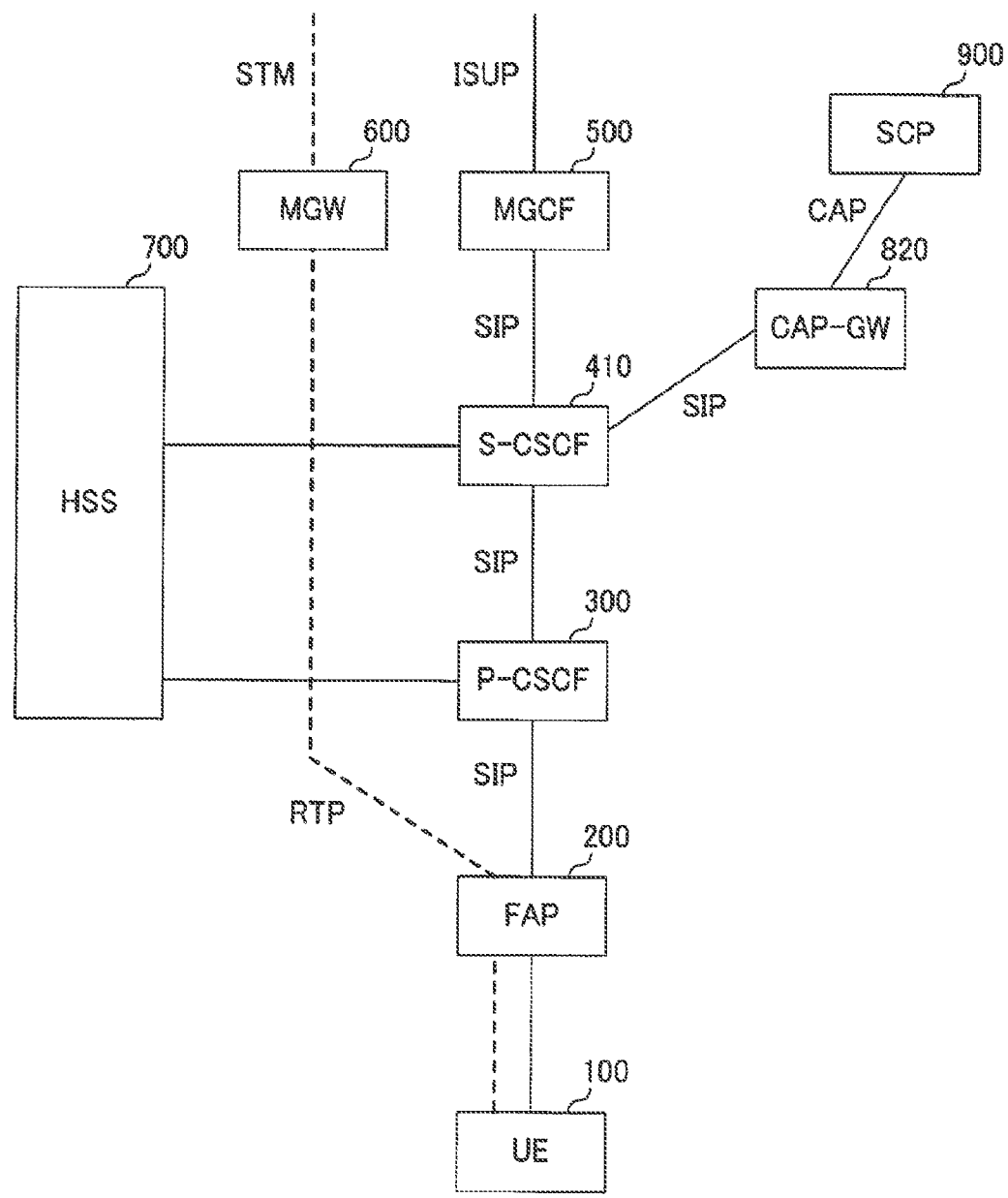
FIG. 6 is a diagram showing a second exemplary embodiment of the communication system of the present invention.

FIG. 6 is a diagram showing a second exemplary embodiment of the communication system of the present invention.

As shown in FIG. 6, the communication system in the present exemplary embodiment includes UE100, FAP 200, P-CSCF300, S-CSCF 410, MGCF 500, MGW 600, HSS 700, CAP-GW 820 and SCP 900. Here, the communication system shown in FIG. 6 is included in an IMS network.

UE100, FAP 200, P-CSCF300, MGCF 500, MGW 600, HSS 700 and SCP 900 in the present exemplary embodiment are the same as those in the first exemplary embodiment.

S-CSCF 410 further includes the functions of AS-A 800 and AS-B 810 in comparison with S-CSCF 400 shown in FIG. 1. However, S-CSCF 410 does not include the interface of CAP.

CAP-GW 820 is a gateway server which carries out mutual conversion between SIP protocol which is an interface between CAP-GW 820 and S-CSCF 410, and CAP which is an interface between CAP-GW 820 and SCP 900.

Figure 7:
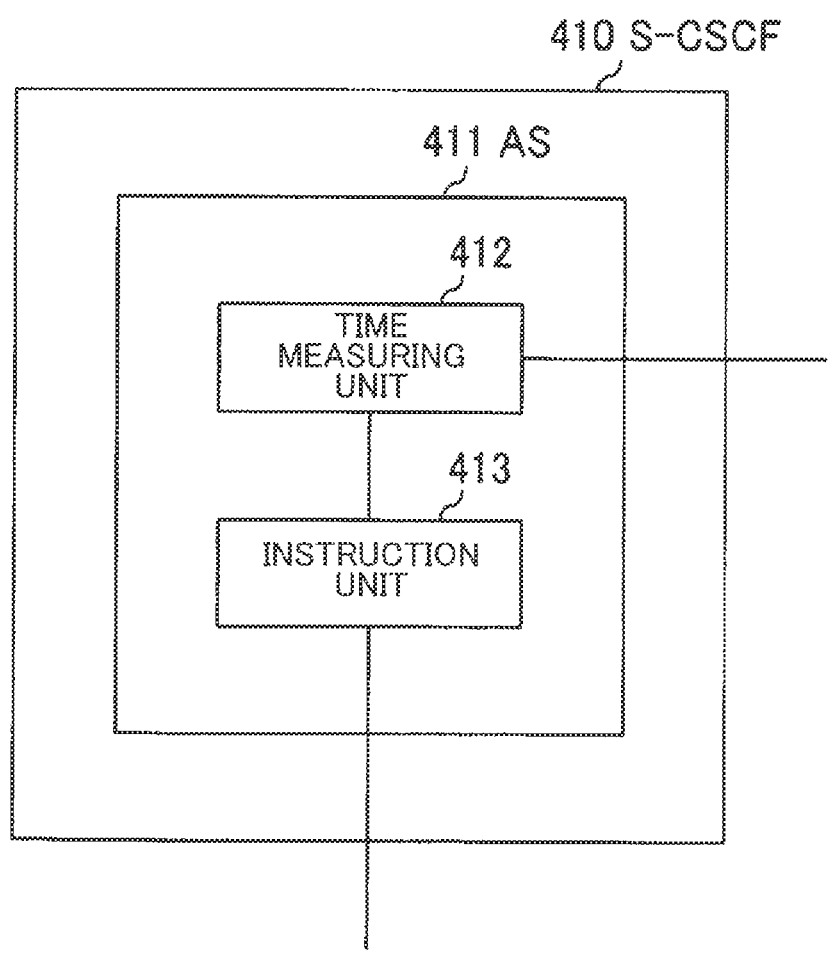
FIG. 7 is a diagram showing an example of an internal configuration of S-CSCF shown in FIG. 6.

FIG. 7 is a diagram showing an example of an internal configuration of S-CSCF 410 shown in FIG. 6.

S-CSCF 410 shown in FIG. 6 includes AS 411 as shown in FIG. 7. Furthermore, AS 411 includes a time measuring unit 412 and an instruction unit 413. Here, FIG. 7 shows an example of main components, which are related to the present exemplary embodiment, out of the components of S-CSCF 410 shown in FIG. 6.

The time measuring unit 412 starts measuring a calltime at a time when UE 100 starts a voice transmitting call. Moreover, in the case that UE 100 starts the call, the time measuring unit 412 acquires an available call time of UE 100 from SCP 900 through CAP-GW 820.

The instruction unit 413 issues a multiplexing instruction to FAP 200 through P-CSCF 300 in the case that a time, which is acquired by subtracting the calltime measured by the time measuring unit 412 from the available calltime of UE 100 which the time measuring unit 412 acquires from SCP 900, reaches a predetermined time. That is, the instruction unit 413 issues the multiplexing instruction at a predetermined point of time which is earlier than an expiration time of the available calltime of UE 100. The predetermined time can be set externally and is set in order to notify that the available calltime (remainder) expires soon.

Hereinafter, a notification method in the communication system shown in FIG. 6 will be explained. Here, each signal, which is used for sending and receiving information, is based on corresponding protocol.

Each of FIGS. 8A to 8C is a sequence diagram showing the notification method in the communication system shown in FIG. 6.

Firstly, when UE 100 issues a position registration request to FAP 200 (Step 101), FAP 200 issues a UE 100's position registration request by sending SIP-REGISTER to P-CSCF 300 (Step 102). Then, P-CSCF 300 issues a UE 100's position registration request by sending Dia-Cx-UAR to HSS 700 (Step 103). HSS 700, which receives Dia-Cx-UAR, issues a position registration response by sending Dia-Cx-UAA to P-CSCF 300 as a response to Dia-Cx-UAR (Step 104)

Then, P-CSCF 300 issues a UE 100's position registration request by sending SIP-REGISTER to S-CSCF 410 (Step 105). S-CSCF 410, which receives SIP-REGISTER, issues a UE 100's position registration request by sending Dia-Cx-SAR to HSS 700 (Step 106). HSS 700, which receives Dia-Cx-SAR, issues a position registration response by sending Dia-Cx-SAA to S-CSCF 410 (Step 107).

Then, S-CSCF 410, which receives Dia-Cx-SAA, issues a position registration response by sending SIP-200 OK to P-CSCF 300 as a response to Step 105 (Step 108). P-CSCF 300, which receives SIP-200 OK, issues a position registration response by sending SIP-200 OK to FAP 200 as a response to Step 102 (Step 109).

Afterward, UE 100 requests voice transmission to FAP 200 (Step 110), and then FAP 200 issues a voice transmission request by sending SIP-INVITE to P-CSCF 300 (Step 111). Then, by sending SIP-100 to FAP 200, P-CSCF 300 notifies that INVITE is being executed (Step 112). Moreover, P-CSCF 300 sends SIP-INVITE to S-CSCF 410 for establishing a session (Step 113). Then, by sending SIP-100 to P-CSCF 300, S-CSCF 410 notifies that INVITE is being executed (Step 114).

Next, S-CSCF 410 outputs a call setting report by sending CAP-IDP to SCP 900 through CAP-GW 820 (Step 115). SCP 900, which receives CAP-IDP, issues a call continuation instruction by sending CAP-CUE to S-CSCF 410 through CAP-GW 820 (Step 116).

Next, S-CSCF 410 sends SIP-INVITE to MGCF 500 (Step 117). Then, by sending SIP-100 to S-CSCF 410, MGCF 500 notifies that INVITE is being executed (Step 118).

Moreover, by sending SIP-183 to S-CSCF 410, MGCF 500 notifies that a session is being progressed (Step 119). S-CSCF 410, which receives SIP-183, sends SIP-183 to P-CSCF 300 (Step 120). P-CSCF 300, which receives SIP-183, sends SIP-183 to FAP 200 (Step 121).

Afterward, MGCF 500 responds to the transmission request by sending SIP-200 OK to S-CSCF 410 (Step 122).

Then, S-CSCF 410 outputs a user's call arrival response report by sending CAP-ERB to SCP 900 through CAP-GW 820 (Step 123). SCP 900, which receives CAP-ERB, indicates the available calltime of UE 100 by sending CAP-ACH to S-CSCF 410 through CAP-GW 820 (Step 124). This point of time is a call start time, and the time measuring unit 412 starts measuring the calltime. Moreover, S-CSCF 410 acquires the available calltime of UE 100 by receiving this CAP-ACH.

Then, S-CSCF 410 sends SIP-200 OK to P-CSCF 300 (Step 125). P-CSCF 300 sends SIP-200 OK to FAP 200 (Step 126).

Then, FAP 200 sends SIP-ACK to P-CSCF 300 (Step 127). P-CSCF 300 sends SIP-ACK to S-CSCF 410 (Step 128). By carrying out the above, FAP 200 sends a notification, which indicates that FAP 200 acknowledges establishment of the session, to S-CSCF 410.

Moreover, FAP 200 responds (Answer) to the transmission request of UE 100 (Step 129).

Moreover, S-CSCF 410, which receives SIP-ACK, sends SIP-ACK to MGCF 500 (Step 130).

In the case that, as a result of starting the call, the time, which is acquired by subtracting the time measured by the time measuring unit 412 from the available calltime of UE 100 acquired by S-CSCF 410 in Step 124, reaches the predetermined time (for example, X seconds), that is, in the case that, as a result of the time measurement by the time measuring unit 412, the left time of the available call time of UE 100 reaches X seconds before expiration of the available call time of UE 100, the instruction unit 413 generates a message (SIP-INFO) in order to make FAP 200 insert (multiplex) the alert tone in the voice data (Step 131) Then, the instruction unit 413 sends the generated SIP-INFO to P-CSCF 300 (Step 132). P-CSCF 300 sends SIP-INFO to FAP 200 (Step 133).

FAP 200, which receives SIP-INFO, sends SIP-200 OK to P-CSCF 300 as a response of SIP-INFO (Step 134). P-CSCF 300 sends SIP-200 OK to S-CSCF 410 (Step 135).

Moreover, the multiplexing unit 201 of FAP 200, which receives SIP-INFO sent by P-CSCF 300 in Step 133, multiplexes (insert) the alert tone, which is based on the stored tone source file, with the voice data which are sent to UE 100. Then, the sending unit 202 sends the voice data, with which the alert tone is multiplexed, to UE 100 (Step 136).

In the case that, as a result of continuation of the call, the available call time of UE 100, which S-CSCF 410 acquires in Step 124, becomes equal to the time which is measured by the time measuring unit 412, that is, in the case that the available call time of UE 100 expires, S-CSCF 410 outputs a call release report by sending CAP-ACR to SCP 900 through CAP-GW 820 (Step 137).

Moreover, S-CSCF 410 issues a session disconnection request by sending SIP-BYE to P-CSCF 300 (Step 138). Then, P-CSCF 300 sends SIP-BYE to FAP 200 (Step 139).

FAP 200, which receives SIP-BYE sent by P-CSCF 300, sends SIP-200 OK to P-CSCF 300 as a response to SIP-BYE (Step 140). P-CSCF 300 sends SIP-200 OK to S-CSCF 410 (Step 141).

Moreover, FAP 200, which receives SIP-BYE sent by P-CSCF 300 in Step 139, releases the call of UE 100, and carries out disconnection (Step 142).

Moreover, S-CSCF 410, which receives SIP-200 OK sent by P-CSCF 300 in Step 141, sends SIP-BYE to MGCF 500 (Step 143). Then, MGCF 500 sends SIP-200 OK to S-CSCF 410 as a response to SIP-BYE (Step 144).

Third Exemplary Embodiment

The process of multiplexing the alert tone with the voice data may be carried out not by FAP but by an external apparatus (external server) arranged outside.

Figure 9:
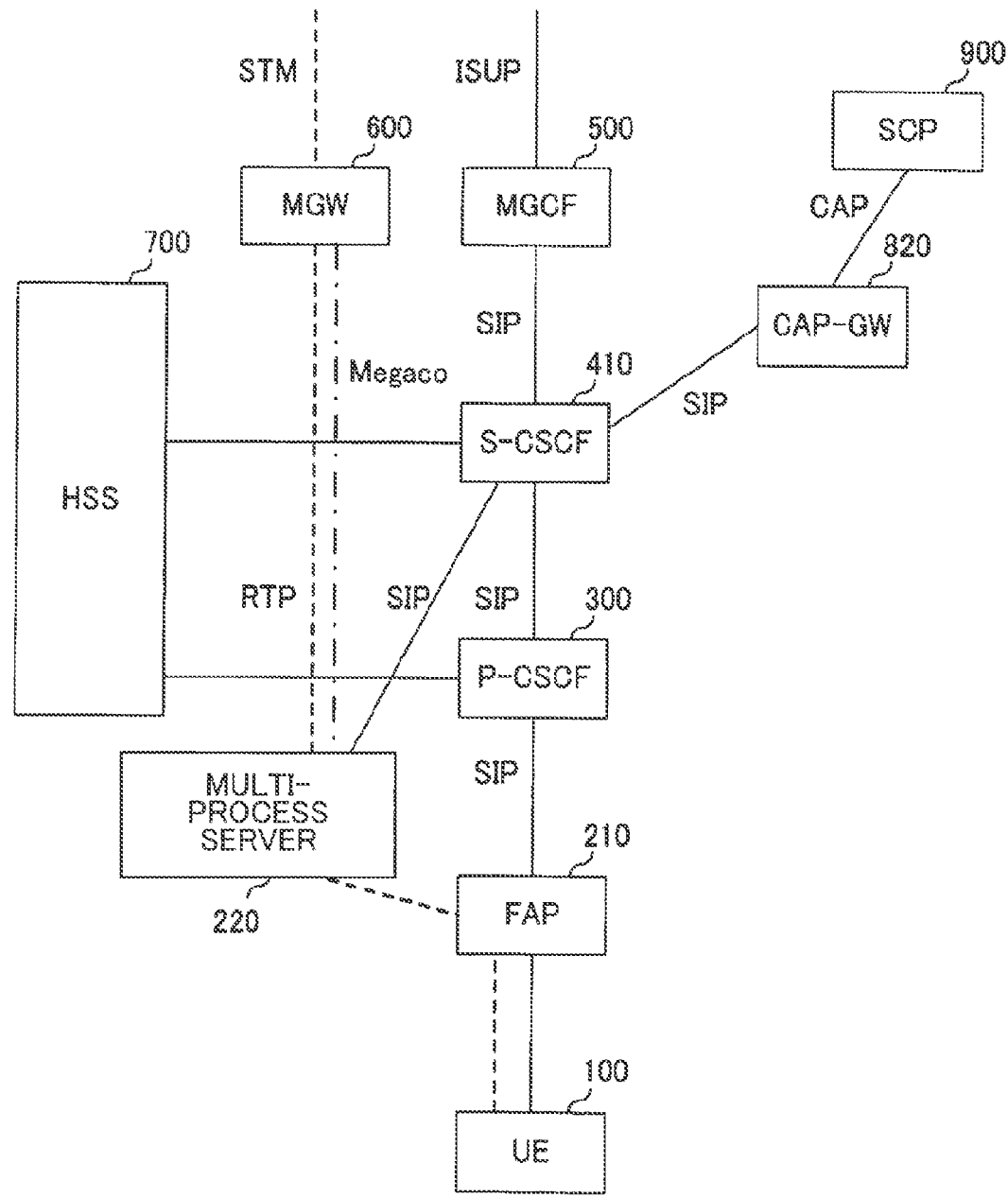
FIG. 9 is a diagram showing a third exemplary embodiment of the communication system of the present invention.

FIG. 9 is a diagram showing a third exemplary embodiment of the communication system of the present invention.

As shown in FIG. 9, the communication system in the present exemplary embodiment includes UE 100, FAP 210, a multi-process server 220, P-CSCF 300, S-CSCF 410, MGCF 500, MGW 600, HSS 700, CAP-GW 820 and SCP 900. Here, the communication system shown in FIG. 9 is included in an IMS network.

UE 100, P-CSCF 300, S-CSCF 410, MGCF 500, MGW 600, HSS 700, CAP-GW 820 and SCP 900 in the present exemplary embodiment are the same as those in the second exemplary embodiment.

FAP 210 has a configuration which is acquired by excluding the multiplexing unit 201 from FAP 200 shown in FIG. 3

The multi-process server 220 is an external server (communication apparatus) which is arranged on a U-Plane path between MGW 600 and FAP 210, and includes a tone source file in advance. Moreover, when receiving a multiplexing instruction, the multi-process server 220 multiplexes a tone, which is based on the stored tone source file, with voice data (U-Plane data) which are sent by MGW 600 to UE 100, and sends the voice data, with which the alert tone is multiplexed, to FAP 210.

Figure 10:
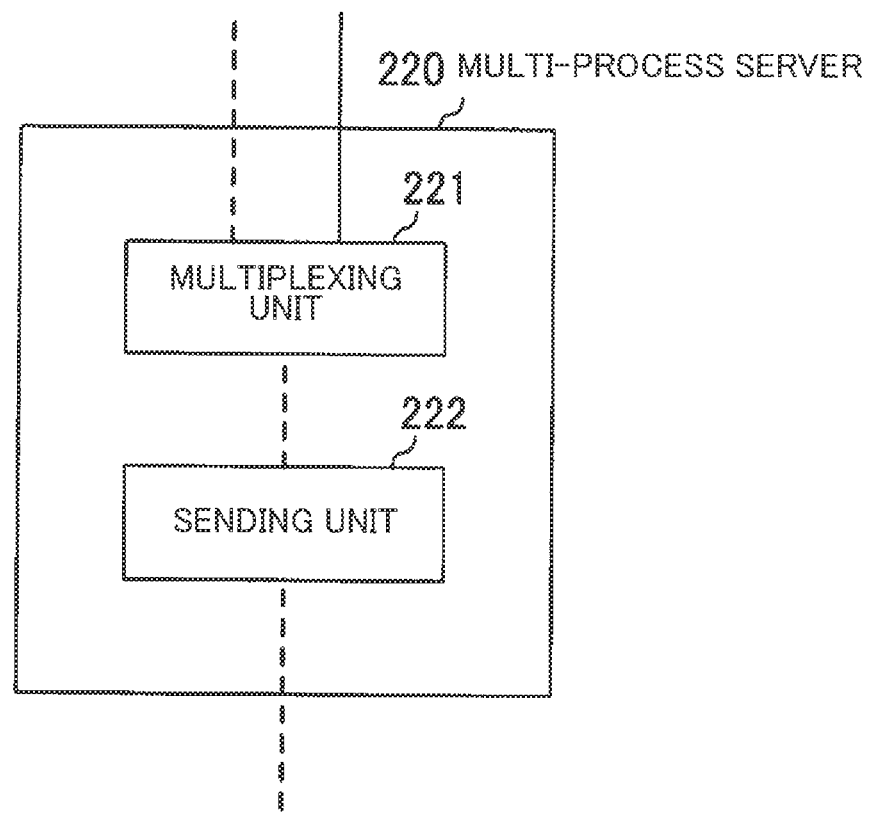
FIG. 10 is a diagram showing an example of an internal configuration of a multi-process server shown in FIG. 9.

FIG. 10 is a diagram showing an example of an internal configuration of the multi-process server 220 shown in FIG. 9.

As shown in FIG. 10, the multi-process server 220 shown in FIG. 9 includes a multiplexing unit 221 and a sending unit 222. Here, FIG. 10 shows an example of main components, which are related to the present exemplary embodiment, out of the components of the multi-process server 220 shown in FIG. 9.

When receiving the multiplexing instruction from S-CSCF 410, the multiplexing unit 221 multiplexes the tone, which is based on the tone source file stored in advance, with the voice data which is sent by MGW 600 to UE 100.

The sending unit 222 sends the voice data, with which the tone is multiplexed by the multiplexing unit 221, to FAP 210.

Hereinafter, a notification method in the communication system shown in FIG. 9 will be explained. Here, each signal, which is used for sending and receiving information, is based on corresponding protocol.

Each of FIGS. 11A to 11C is a sequence diagram for explaining the notification method in the communication system shown in FIG. 9.

Firstly, when UE 100 issues a position registration request to FAP 210 (Step 201), FAP 210 issues a UE 100's position registration request by sending SIP-REGISTER to P-CSCF 300 (Step 202). Then, P-CSCF 300 issues a UE 100's position registration request by sending Dia-Cx-UAR to HSS 700 (Step 203). HSS 700, which receives Dia-Cx-UAR, issues a position registration response by sending Dia-Cx-UAA to P-CSCF 300 as a response to Dia-Cx-UAR (Step 204)

Then, P-CSCF 300 issues a UE 100's position registration request by sending SIP-REGISTER to S-CSCF 410 (Step 205). S-CSCF 410, which receives SIP-REGISTER, issues a UE 100's position registration request by sending Dia-Cx-SAR to HSS 700 (Step 206). HSS 700, which receives Dia-Cx-SAR, issues a position registration response by sending Dia-Cx-SAA to S-CSCF 410 (Step 207).

Then, S-CSCF 410, which receives Dia-Cx-SAA, issues a position registration response by sending SIP-200 OK to P-CSCF 300 as a response to Step 205 (Step 208). P-CSCF 300, which receives SIP-200 OK, issues a position registration response by sending SIP-200 OK to FAP 210 as a response to Step 202 (Step 209).

Afterward, when UE 100 requests voice transmission to FAP 210 (Step 210), FAP 210 issues a voice transmission request to P-CSCF 300 by sending SIP-INVITE (Step 211).

Then, by sending SIP-100 to FAP 210, P-CSCF 300 notifies that INVITE is being executed (Step 212). Moreover, P-CSCF 300 sends SIP-INVITE to S-CSCF 410 for establishing a session (Step 213). Then, by sending SIP-100 to P-CSCF 300, S-CSCF 410 notifies that INVITE is being executed (Step 214). Moreover, S-CSCF 410 sends SIP-INVITE to the multi-process server 220 (Step 215). Then, by sending SIP-100 to S-CSCF 410, the multi-process server 220 notifies that INVITE is being executed (Step 216). Moreover, the multi-process server 220 sends SIP-INVITE to S-CSCF 410 (Step 217). Then, by sending SIP-100 to the multi-process server 220, S-CSCF 410 notifies that INVITE is being executed (Step 218).

Next, S-CSCF 410 outputs a call setting report by sending CAP-IDP to SCP 900 through CAP-GW 820 (Step 219). SCP 900, which receives CAP-IDP, issues a call continuation instruction by sending CAP-CUE to S-CSCF 410 through CAP-GW 820 (Step 220).

Moreover, S-CSCF 410 sends SIP-INVITE to MGCF 500 (Step 221). Then, by sending SIP-100 to S-CSCF 410, MGCF 500 notifies that INVITE is being executed (Step 222).

Moreover, by sending SIP-183 to S-CSCF 410, MGCF 500 notifies that a session is being progressed (Step 223). Then, by sending SIP-183 to the multi-process server 220, S-CSCF 410 notifies that a session is being progressed (Step 224).

Next, by sending SIP-183 to S-CSCF 410, the multi-process server 220 notifies that a session is being progressed (Step 225). S-CSCF 410, which receives SIP-183, sends SIP-183 to P-CSCF 300 (Step 226). P-CSCF 300, which receives SIP-183, sends SIP-183 to FAP 210 (Step 227).

Afterward, by sending SIP-200 OK to S-CSCF 410, MGCF 500 responds to the voice transmission request (Step 228).

Then, S-CSCF 410 outputs a user's call arrival response report by sending CAP-ERB to SCP 900 through CAP-GW 820 (Step 229). SCP 900, which receives CAP-ERB, indicates the available calltime of UE 100 by sending CAP-ACH to S-CSCF 410 through CAP-GW 820 (Step 230). This point of time is a call start time, and the time measuring unit 412 starts measuring the calltime. Moreover, S-CSCF 410 acquires the available calltime of UE 100 by receiving this CAP-ACH.

Moreover, S-CSCF 410 sends SIP-200 OK to the multi-process server 220 (Step 231). The multi-process server 220, which receives SIP-200 OK, sends SIP-200 OK to S-CSCF 410 (Step 232). S-CSCF 410, which receives SIP-200 OK, sends SIP-200 OK to P-CSCF 300 (Step 233). P-CSCF 300 sends SIP-200 OK to FAP 210 (Step 234).

Then, FAP 210 sends SIP-ACK to P-CSCF 300 (Step 235). P-CSCF 300 sends SIP-ACK to S-CSCF 410 (Step 236). By carrying out the above, FAP 210 sends a notification, which indicates that FAP 210 acknowledges establishment of the session, to S-CSCF 410.

Moreover, FAP 210 responds (Answer) to the transmission request of UE 100 (Step 237).

Then, S-CSCF 410, which receives SIP-ACK, sends SIP-ACK to the multi-process server 220 (Step 238). Then, the multi-process server 220 sends SIP-ACK to S-CSCF 410 (Step 239). S-CSCF 410, which receives SIP-ACK, sends SIP-ACK to MGCF 500 (Step 240).

In the case that, as a result of starting the call, a time, which is acquired by subtracting the time measured by the time measuring unit 412 from the available calltime of UE 100 acquired by S-CSCF 410 in Step 230, reaches the predetermined time (for example, X seconds), that is, in the case that, as a result of the time measurement by the time measuring unit 412, the left time of the available call time of UE 100 reaches X seconds before expiration of the available call time of UE 100, the instruction unit 413 generates a message (SIP-INFO) in order to make the multi-process server 220 insert (multiplex) the alert tone in the voice data (Step 241). Then, the instruction unit 413 sends the generated SIP-INFO to the multi-process server 220 (Step 242). The multi-process server 220, which receives SIP-INFO, sends SIP-200 OK to S-CSCF 410 as a response to SIP-INFO (Step 243).

Moreover, the multiplexing unit 221 of the multi-process server 220, which receives SIP-INFO sent by S-CSCF 410 in Step 242, multiplexes (insert) the alert tone, which is based on the stored tone source file, with the voice data which is sent to UE 100. Then, the sending unit 222 sends the voice data, with which the alert tone is multiplexed, to UE 100 through FAP 210 (Step 244).

In the case that, as a result of continuation of the call, the available call time of UE 100, which S-CSCF 410 acquires in Step 230, becomes equal to the time which is measured by the time measuring unit 412, that is, in the case that the available calltime of UE 100 expires, S-CSCF 410 outputs a call release report by sending CAP-ACR to SCP 900 through CAP-GW 820 (Step 245).

Moreover, S-CSCF 410 sends SIP-BYE to P-CSCF 300 (Step 246). P-CSCF 300 issues a session disconnection request by sending SIP-BYE to FAP 210 (Step 247).

FAP 210, which receives SIP-BYE sent by P-CSCF 300, sends SIP-200 OK to P-CSCF 300 as a response to SIP-BYE (Step 248). P-CSCF 300 sends SIP-200 OK to S-CSCF 410 (Step 249).

Moreover, FAP 210, which receives SIP-BYE sent by P-CSCF 300 in Step 247, releases the call of UE 100, and carries out disconnection (Step 250).

Moreover, S-CSCF 410 sends SIP-BYE to MGCF 500 (Step 251). Then, MGCF 500 sends SIP-200 OK to S-CSCF 410 as a response to SIP-BYE (Step 252).

Here, while the case that S-CSCF 410 includes the AS function is exemplified in the present exemplary embodiment similarly to the second exemplary embodiment, the AS function may be arranged on a server different from S-CSCF similarly to the first exemplary embodiment.

As explained in the first to the third exemplary embodiments, by multiplexing the alert tone, which alerts that the expiration time of the calltime comes soon, with the voice data sent to the communication terminal of the prepaid user, the prepaid user can recognize that the expiration time of the available calltime comes soon even when the prepaid user is talking by use of the communication terminal.

The whole or part of the exemplary embodiments disclosed above can be described as, but not limited to, the following supplementary notes.

(Supplementary note 1) A communication system in an IMS (IP Multimedia Subsystem), comprising:

an application providing means, a SIP server, a femto-cell base station, and a communication terminal held by a prepaid user, wherein the application providing means starts measuring a calltime at a time when the communication terminal starts a voice transmitting call, and issues a multiplexing instruction to the femto-cell base station in the case that a time, which is acquired by subtracting the calltime from an available calltime of the communication terminal, reaches a predetermined time, and wherein when receiving the multiplexing instruction, the femto-cell base station sends a tone, which is based on a tone source file stored in advance, multiplexed with voice data which are sent to the communication terminal, to the communication terminal.

(Supplementary note 2) The communication system according to Supplementary note 1, characterized in that:

in the case that the communication terminal starts the call, the application providing means acquires the available calltime of the communication terminal from a node which controls provision of a service.

(Supplementary note 3) The communication system according to Supplementary note 1 or Supplementary note 2, characterized in that:

the application providing means issues the multiplexing instruction to the femto-cell base station through the SIP server.

(Supplementary note 4) The communication system according to Supplementary note 1 or Supplementary note 2, characterized in that: the application providing means is included in the SIP server.

(Supplementary note 5) A communication system in an IMS network, comprising:

an application providing means, a femto-cell base station, and a communication terminal held by a prepaid user, wherein the communication system further includes a multi-process server arranged between a gateway which processes voice data of a voice transmitting call of the communication terminal, and the femto-cell base station, wherein the application providing means starts measuring a calltime at a time when the communication terminal starts the voice transmitting call, and issues a multiplexing instruction to the multi-process server in the case that a time, which is acquired by subtracting the calltime from an available calltime of the communication terminal, reaches a predetermined time, wherein when receiving the multiplexing instruction, the multi-process server sends a tone, which is based on a tone source file stored in advance, multiplexed with voice data which are sent to the communication terminal, to the femto-cell base station, and wherein the femto-cell base station sends the voice data, which is sent by the multi-process server and with which the tone is multiplexed, to the communication terminal.

(Supplementary note 6) The communication system according to Supplementary note 5, characterized in that:

in the case that the communication terminal starts the call, the application providing means acquires the available calltime of the communication terminal from a node which controls provision of a service.

(Supplementary note 7) An application providing server, comprising:

a time measuring unit which starts measuring a calltime at a time when a communication terminal, which is held by a prepaid user existing in an IMS network, starts a voice transmitting call; and an instruction unit to issue a multiplexing instruction to a femto-cell base station, which sends voice data to the communication terminal, in the case that a time, which is acquired by subtracting the calltime measured by the time measuring unit from an available calltime of the communication terminal, reaches a predetermined time.

(Supplementary note 8) A SIP server: comprising:

an application providing server which is described in Supplementary note 7.

(Supplementary note 9) A femto-cell base station, comprising:

a multiplexing unit which, when receiving a multiplexing instruction from an application providing means which provides a service in an IMS network, multiplexes a tone, which is based on a tone source file stored in advance, with voice data which are sent to a communication terminal used by a prepaid user for voice transmission; and a sending unit to send the voice data, with which the tone is multiplexed by the multiplexing unit, to the communication terminal.

(Supplementary note 10) A multi-process server, comprising:

a multiplexing unit which, when receiving a multiplexing instruction from an application providing means which provides a service in an IMS network, multiplexes a tone, which is based on a tone source file stored in advance, with voice data which are sent to a communication terminal used by a prepaid user for voice transmission; and a sending unit to send the voice data, with which the tone is multiplexed by the multiplexing unit, to a femto-cell base station which sends voice data to the communication terminal.

(Supplementary note 11) A notification method in a communication system, which includes an application providing means, a femto-cell base station, and a communication terminal held by a prepaid user, in an IMS network, comprising:

a process that the application providing means measures a calltime from a time when the communication terminal starts a voice transmitting call;

a process that the application providing means issues a multiplexing instruction to the femto-cell base station in the case that a time, which is acquired by subtracting the calltime from an available calltime of the communication terminal, reaches a predetermined time;

a process that, when receiving the multiplexing instruction, the femto-cell base station multiplexes a tone, which is based on a tone source file stored in advance, with voice data which are sent to the communication terminal; and a process that the femto-cell base station sends the voice data, with which the tone is multiplexed, to the communication terminal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-084627, filed on Apr. 15, 2013, the disclosure of which is incorporated herein in its entirety by reference.

The invention claimed is:

1. A communication system in an IMS (IP Multimedia Subsystem) network, comprising:

an application providing unit, a femto-cell base station, an SIP server, and a communication terminal held by a prepaid user, wherein the application providing unit starts measuring a calltime at a time when the communication terminal starts a voice transmitting call, and issues a multiplexing instruction to the femto-cell base station through the SIP server in the case that a time, which is acquired by subtracting the calltime from an available calltime of the communication terminal, reaches a predetermined time, and wherein when receiving the multiplexing instruction, the femto-cell base station sends a tone, which is based on a tone source file stored in advance, multiplexed with voice data which are sent to the communication terminal, to the communication terminal.

2. The communication system according to claim 1, wherein:
in the case that the communication terminal starts the call, the application providing unit acquires the available calltime of the communication terminal from a node which controls provision of a service.

3. An application providing server, comprising:
a time measuring unit which starts measuring a calltime at a time when a communication terminal, which is held by a prepaid user existing in an IMS network, starts a voice transmitting call;
an SIP server; and
an instruction unit to issue a multiplexing instruction to a femto-cell base station through the SIP server, which sends voice data to the communication terminal, in the case that a time, which is acquired by subtracting the calltime measured by the time measuring unit from an available calltime of the communication terminal, reaches a predetermined time.

4. A femto-cell base station, comprising:
a multiplexing unit which, when receiving a multiplexing instruction from an application providing unit from an SIP server, the application providing unit provides a service in an IMS network, multiplexes a tone, which is based on a tone source file stored in advance, with voice data which are sent to a communication terminal used by a prepaid user for voice transmission; and
a sending unit to send the voice data, with which the tone is multiplexed by the multiplexing unit, to the communication terminal.

5. A notification method in a communication system, which includes an application providing unit, a femto-cell base station, an SIP server, and a communication terminal held by a prepaid user, in an IMS network, comprising:
measuring a calltime from a time when the communication terminal starts a voice transmitting call;
issuing a multiplexing instruction to the femto-cell base station through the SIP server in the case that a time, which is acquired by subtracting the calltime from an available calltime of the communication terminal, reaches a predetermined time;
multiplexing a tone, which is based on a tone source file stored in advance, with voice data which are sent to the communication terminal, when receiving the multiplexing instruction; and
sending the voice data, with which the tone is multiplexed, to the communication terminal.

* * * * *